US011817978B2

(12) United States Patent
Nam et al.

(10) Patent No.: US 11,817,978 B2
(45) Date of Patent: Nov. 14, 2023

(54) TECHNIQUES FOR CONFIGURING MULTI-TRANSMISSION RECEPTION POINT COMMUNICATION SCHEMES

(71) Applicant: QUALCOMM Incorporated, San Diego, CA (US)

(72) Inventors: Wooseok Nam, San Diego, CA (US); Mostafa Khoshnevisan, San Diego, CA (US); Tao Luo, San Diego, CA (US); Xiaoxia Zhang, San Diego, CA (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/513,555

(22) Filed: Oct. 28, 2021

(65) Prior Publication Data

US 2022/0141061 A1 May 5, 2022

Related U.S. Application Data

(60) Provisional application No. 63/108,787, filed on Nov. 2, 2020.

(51) Int. Cl.
*H04L 27/26* (2006.01)
*H04L 25/02* (2006.01)
*H04L 27/18* (2006.01)
*H04W 72/20* (2023.01)

(52) U.S. Cl.
CPC ...... *H04L 27/2602* (2013.01); *H04L 25/0202* (2013.01); *H04L 27/18* (2013.01); *H04W 72/20* (2023.01)

(58) Field of Classification Search
None
See application file for complete search history.

(56) References Cited

U.S. PATENT DOCUMENTS

| 2015/0146644 | A1  | 5/2015 | Kim et al. | |
|---|---|---|---|---|
| 2022/0116256 | A1* | 4/2022 | Shahmohammadian | H04L 5/0048 |
| 2022/0132526 | A1* | 4/2022 | Nam | H04L 5/0094 |
| 2022/0232614 | A1* | 7/2022 | Gao | H04L 5/0048 |

(Continued)

OTHER PUBLICATIONS

International Search Report and Written Opinion—PCT/US2021/057258—ISA/EPO—dated Feb. 28, 2022.

*Primary Examiner* — Anh Vu H Ly
(74) *Attorney, Agent, or Firm* — Holland & Hart LLP/QUALCOMM INCORPORATED

(57) ABSTRACT

Methods, systems, and devices for wireless communications are described. A user equipment (UE) may transmit a message to a transmission reception point (TRP) in a multi-TRP network that indicates a capability of the UE to support a communication scheme (e.g., a spatial division multiplexing (SDM) scheme, a single frequency network (SFN) scheme, a combined SDM and SFN scheme, or the like). The UE may receive a configuration that indicates parameters common to both the SDM scheme and the SFN scheme. The TRP may transmit an indication of an SDM scheme, an SFN scheme, a combined SDM and SFN scheme, or the like to the UE for communications between the UE and one or more TRPs. The UE may communicate with the one or more TRPs based on the communication scheme indicated by the TRP.

29 Claims, 17 Drawing Sheets

(56) References Cited

U.S. PATENT DOCUMENTS

| | | | |
|---|---|---|---|
| 2022/0394708 A1* | 12/2022 | Gao | H04W 72/0446 |
| 2023/0028180 A1* | 1/2023 | Lee | H04L 5/00 |
| 2023/0058765 A1* | 2/2023 | Zhu | H04L 5/0023 |
| 2023/0073095 A1* | 3/2023 | Kim | H04W 72/04 |

* cited by examiner

TECHNIQUES FOR CONFIGURING MULTI-TRANSMISSION RECEPTION POINT COMMUNICATION SCHEMES

CROSS REFERENCE

The present Application for Patent claims the benefit of U.S. Provisional Patent Application No. 63/108,787 by NAM et al., entitled "TECHNIQUES FOR CONFIGURING MULTI-TRANSMISSION RECEPTION POINT COMMUNICATION SCHEMES," filed Nov. 2, 2020, assigned to the assignee hereof, and expressly incorporated by reference herein.

FIELD OF TECHNOLOGY

The following relates to wireless communications, including techniques for configuring multi-transmission reception point (multi-TRP) communication schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for configuring multi-transmission reception point (multi-TRP) communication schemes. Generally, the described techniques provide for a user equipment (UE) to transmit a message to a TRP in a multi-TRP network that indicates a capability of the UE to support a communication scheme (e.g., a spatial division multiplexing (SDM) scheme, a single frequency network (SFN) scheme, a combined SDM and SFN scheme, or the like). The UE may receive a configuration that indicates parameters common to both the SDM scheme and the SFN scheme. In some cases, the TRP may transmit an indication of an SDM scheme, an SFN scheme, a combined SDM and SFN scheme, or the like to the UE for communications between the UE and one or more TRPs. For example, the indication may include one or more parameters specific to an SDM scheme, an SFN scheme, a combined SDM and SFN scheme, or the like. In some examples, the UE may communicate with the one or more TRPs based on the communication scheme indicated by the TRP. For example, the UE may receive signaling from a TRP and may adapt a processing procedure (e.g., a channel estimation procedure) of the received signaling based on the indicated communication scheme.

A method for wireless communications at a UE is described. The method may include receiving a configuration that indicates parameters for a SDM scheme and a SFN scheme supported by the UE for communicating with multiple TRPs, the parameters including a first set of parameters common to both the SDM scheme and the SFN scheme, receiving an indication of a communication scheme for the UE to use for communications with the multi-TRPs, the communication scheme including the SDM scheme, the SFN scheme, or a combination of the SDM scheme and the SFN scheme, and communicating with the multi-TRPs using the parameters of the received configuration that correspond to the indicated communication scheme.

An apparatus for wireless communications at a UE is described. The apparatus may include a processor, memory in electronic communication with the processor, and instructions stored in the memory. The instructions may be executable by the processor to cause the apparatus to receive a configuration that indicates parameters for a SDM scheme and a SFN scheme supported by the UE for communicating with multiple TRPs, the parameters including a first set of parameters common to both the SDM scheme and the SFN scheme, receive an indication of a communication scheme for the UE to use for communications with the multi-TRPs, the communication scheme including the SDM scheme, the SFN scheme, or a combination of the SDM scheme and the SFN scheme, and communicate with the multi-TRPs using the parameters of the received configuration that correspond to the indicated communication scheme.

Another apparatus for wireless communications at a UE is described. The apparatus may include means for receiving a configuration that indicates parameters for a SDM scheme and a SFN scheme supported by the UE for communicating with multiple TRPs, the parameters including a first set of parameters common to both the SDM scheme and the SFN scheme, means for receiving an indication of a communication scheme for the UE to use for communications with the multi-TRPs, the communication scheme including the SDM scheme, the SFN scheme, or a combination of the SDM scheme and the SFN scheme, and means for communicating with the multi-TRPs using the parameters of the received configuration that correspond to the indicated communication scheme.

A non-transitory computer-readable medium storing code for wireless communications at a UE is described. The code may include instructions executable by a processor to receive a configuration that indicates parameters for a SDM scheme and a SFN scheme supported by the UE for communicating with multiple TRPs, the parameters including a first set of parameters common to both the SDM scheme and the SFN scheme, receive an indication of a communication scheme for the UE to use for communications with the multi-TRPs, the communication scheme including the SDM scheme, the SFN scheme, or a combination of the SDM scheme and the SFN scheme, and communicate with the multi-TRPs using the parameters of the received configuration that correspond to the indicated communication scheme.

Some examples of the method, apparatuses, and non-transitory computer-readable medium described herein may further include operations, features, means, or instructions for transmitting a message that indicates a capability of the UE to support the SDM scheme and the SFN scheme for communicating with multi TRPs.

Some examples of the method, apparatuses, and non-transitory computer-readable medium described herein may further include operations, features, means, or instructions for determining a second set of parameters for communicating with the multi-TRPs, the second set of parameters specific to the communication scheme based on the configuration and communicating with the multi-TRPs based on the first and second sets of parameters.

Some examples of the method, apparatuses, and non-transitory computer-readable medium described herein may further include operations, features, means, or instructions for receiving an indication of the second set of parameters in the configuration.

In some examples of the method, apparatuses, and non-transitory computer-readable medium described herein, transmitting the message that indicates the capability may include operations, features, means, or instructions for transmitting a set of capabilities including a number of spatial quasi-colocation (QCL) assumptions or beams capable of being maintained by the UE, a number of transmission configuration indicator (TCI) states supported by the UE, a number of TCI codepoints supported by the UE, or any combination thereof, for one or both of the SDM scheme and the SFN scheme.

Some examples of the method, apparatuses, and non-transitory computer-readable medium described herein may further include operations, features, means, or instructions for receiving signaling from the multi-TRPs, a network node, or both, in accordance with one or both of the SDM scheme and the SFN scheme based on the configuration.

Some examples of the method, apparatuses, and non-transitory computer-readable medium described herein may further include operations, features, means, or instructions for determining one or both of a configurability value or a number of demodulation reference signal (DMRS) ports from each TRP of the multi-TRPs based on the communication scheme, where the signaling may be received based on the configurability value or the number of DMRS ports.

Some examples of the method, apparatuses, and non-transitory computer-readable medium described herein may further include operations, features, means, or instructions for performing channel estimation on the signaling using multiple sets of DMRS ports based on the configuration indicating the SDM scheme, each of the multiple sets of DMRS ports corresponding to a respective TRP of the multi-TRPs.

Some examples of the method, apparatuses, and non-transitory computer-readable medium described herein may further include operations, features, means, or instructions for performing channel estimation using a common set of DMRS ports based on the configuration indicating a first type of the SFN scheme, the common set of DMRS ports being common across the multi-TRPs.

Some examples of the method, apparatuses, and non-transitory computer-readable medium described herein may further include operations, features, means, or instructions for performing channel estimation using multiple sets of DMRS ports based on the configuration indicating a second type of the SFN scheme, each of the multiple sets of DMRS ports corresponding to a respective TRP of the multi-TRPs.

Some examples of the method, apparatuses, and non-transitory computer-readable medium described herein may further include operations, features, means, or instructions for identifying the multi-TRPs for communications based on two or more TCI states being mapped to a TCI codepoint for the UE.

Some examples of the method, apparatuses, and non-transitory computer-readable medium described herein may further include operations, features, means, or instructions for determining the communication scheme based on an association between a set of parameters indicated in the configuration and the communication scheme.

In some examples of the method, apparatuses, and non-transitory computer-readable medium described herein, receiving the indication of the communication scheme may include operations, features, means, or instructions for receiving an indication of the communication scheme in a mode indicator field of a radio resource control (RRC) message.

In some examples of the method, apparatuses, and non-transitory computer-readable medium described herein, receiving the indication of the communication scheme may include operations, features, means, or instructions for receiving a downlink control information (DCI) message that includes an indication of the communication scheme.

In some examples of the method, apparatuses, and non-transitory computer-readable medium described herein, the indication of the communication scheme includes an explicit indication in the DCI message.

In some examples of the method, apparatuses, and non-transitory computer-readable medium described herein, the indication of the communication scheme includes a value for a time domain resource allocation table field of the DCI message that indicates an entry of a time domain resource allocation table that may be associated with the communication scheme.

In some examples of the method, apparatuses, and non-transitory computer-readable medium described herein, the indication of the communication scheme includes a value of a TCI field of the DCI message that indicates a set of multiple TCI states.

Some examples of the method, apparatuses, and non-transitory computer-readable medium described herein may further include operations, features, means, or instructions for determining that the communication scheme includes the SDM scheme based on an first set of parametersantenna port field of the DCI message indicating a set of multiple code division multiplexing (CDM) groups.

Some examples of the method, apparatuses, and non-transitory computer-readable medium described herein may further include operations, features, means, or instructions for determining that the communication scheme includes the SFN scheme based on an antenna port field of the DCI message indicating a single CDM group.

A method for wireless communications at a TRP is described. The method may include transmitting, to a UE, a configuration that indicates parameters for a SDM scheme and a SFN scheme supported by the UE for communicating with multiple TRPs, the parameters including a first set of parameters common to both the SDM scheme and the SFN scheme, and transmitting, to the UE, an indication of a communication scheme for the UE to use for communications with the multi-TRPs, the communication scheme including the SDM scheme, the SFN scheme, or a combination of the SDM scheme and the SFN scheme.

An apparatus for wireless communications at a TRP is described. The apparatus may include a processor, memory in electronic communication with the processor, and instructions stored in the memory. The instructions may be executable by the processor to cause the apparatus to transmit, to a UE, a configuration that indicates parameters for a SDM scheme and a SFN scheme supported by the UE for communicating with multiple TRPs, the parameters including a first set of parameters common to both the SDM scheme and the SFN scheme, and transmit, to the UE, an indication of a communication scheme for the UE to use for communications with the multi-TRPs, the communication scheme including the SDM scheme, the SFN scheme, or a combination of the SDM scheme and the SFN scheme.

Another apparatus for wireless communications at a TRP is described. The apparatus may include means for transmitting, to a UE, a configuration that indicates parameters for a SDM scheme and a SFN scheme supported by the UE for communicating with multiple TRPs, the parameters including a first set of parameters common to both the SDM scheme and the SFN scheme, and means for transmitting, to the UE, an indication of a communication scheme for the UE to use for communications with the multi-TRPs, the communication scheme including the SDM scheme, the SFN scheme, or a combination of the SDM scheme and the SFN scheme.

A non-transitory computer-readable medium storing code for wireless communications at a TRP is described. The code may include instructions executable by a processor to transmit, to a UE, a configuration that indicates parameters for a SDM scheme and a SFN scheme supported by the UE for communicating with multiple TRPs, the parameters including a first set of parameters common to both the SDM scheme and the SFN scheme, and transmit, to the UE, an indication of a communication scheme for the UE to use for communications with the multi-TRPs, the communication scheme including the SDM scheme, the SFN scheme, or a combination of the SDM scheme and the SFN scheme.

Some examples of the method, apparatuses, and non-transitory computer-readable medium described herein may further include receiving, from the UE, a message that indicates a capability of the UE to support the SDM scheme and the SFN scheme for communicating with multi-TRPs.

Some examples of the method, apparatuses, and non-transitory computer-readable medium described herein may further include operations, features, means, or instructions for determining the first set of parameters for communications between the UE and the multi-TRPs based on the capability and determining a second set of parameters for communications between the UE and the multi-TRPs based on the capability, the second set of parameters specific to the communication scheme.

In some examples of the method, apparatuses, and non-transitory computer-readable medium described herein, receiving the message that indicates the capability may include operations, features, means, or instructions for receiving a set of capabilities including a number of spatial QCL assumptions or beams capable of being maintained by the UE, a number of TCI states supported by the UE, a number of TCI codepoints supported by the UE, or any combination thereof, for one or both of the SDM scheme and the SFN scheme.

Some examples of the method, apparatuses, and non-transitory computer-readable medium described herein may further include operations, features, means, or instructions for determining at least one parameter of the parameters for the communication scheme based on the number of spatial QCL assumptions or beams capable of being maintained by the UE, the number of TCI states supported by the UE, the number of TCI codepoints supported by the UE, or any combination thereof.

Some examples of the method, apparatuses, and non-transitory computer-readable medium described herein may further include operations, features, means, or instructions for transmitting signaling to the UE in accordance with the communication scheme based on the configuration.

Some examples of the method, apparatuses, and non-transitory computer-readable medium described herein may further include operations, features, means, or instructions for determining one or both of a configurability value or a number of DMRS ports for each TRP of the multi-TRPs based on the communication scheme, where the signaling may be transmitted based on the configurability value or the number of DMRS ports.

In some examples of the method, apparatuses, and non-transitory computer-readable medium described herein, transmitting the indication of the communication scheme may include operations, features, means, or instructions for transmitting an indication of the communication scheme in a mode indicator field of an RRC message.

In some examples of the method, apparatuses, and non-transitory computer-readable medium described herein, transmitting the indication of the communication scheme may include operations, features, means, or instructions for receiving a DCI message that includes an indication of the communication scheme.

In some examples of the method, apparatuses, and non-transitory computer-readable medium described herein, the indication of the communication scheme includes an explicit indication in the DCI message.

In some examples of the method, apparatuses, and non-transitory computer-readable medium described herein, the indication of the communication scheme includes a value for a time domain resource allocation table field of the DCI message that indicates an entry of a time domain resource allocation table that may be associated with the communication scheme.

In some examples of the method, apparatuses, and non-transitory computer-readable medium described herein, the indication of the communication scheme includes a value of a TCI field of the DCI message that indicates a set of multiple TCI states.

In some examples of the method, apparatuses, and non-transitory computer-readable medium described herein, the DCI message further includes an antenna port field indicating a set of multiple CDM groups to indicate that the communication scheme includes the SDM scheme.

In some examples of the method, apparatuses, and non-transitory computer-readable medium described herein, the DCI message further includes an antenna port field indicating a single CDM group to indicate that the communication scheme includes the SDM scheme.

DETAILED DESCRIPTION

Figure 1:
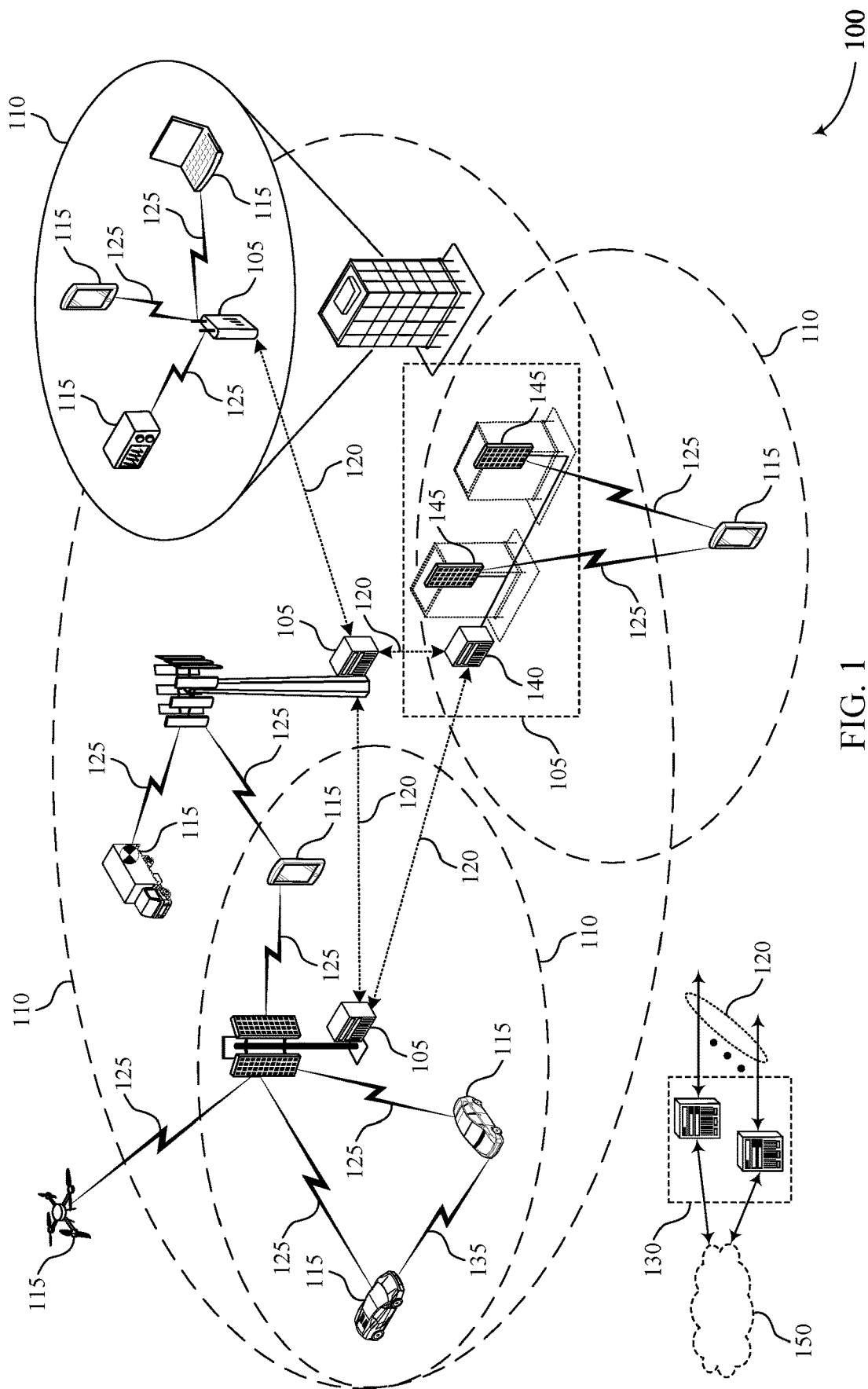
FIGS. 1 and 2 illustrate examples of wireless communications systems that support techniques for configuring multi-transmission reception point (TRP) communication schemes in accordance with aspects of the present disclosure.

In some wireless communications systems, multi-transmission and reception points (multi-TRPs) may communicate with one or more user equipments (UEs) using a communication scheme. In some examples, the communication scheme may include a time division multiplexing (TDM) scheme, a frequency division multiplexing (FDM) scheme, a space division multiplexing (SDM) scheme, or a combination. Additionally or alternatively, the UEs may implement a single frequency network (SFN) scheme in which multiple transmitters (e.g., TRPs) may send a same transmit signal over a same frequency channel, which may be useful in applications involving a high mobility UE, such as a high speed train. Further, the SFN scheme may be useful for some service types, such as broadcast or multicast services. In some examples, the SFN scheme may include a first type of SFN scheme, a second type of SFN scheme, or both (e.g., related to whether a demodulation reference signal (DMRS) for a downlink control channel, a downlink shared channel, or both may be transmitted in an SFN manner). However, the UE may not know which communication scheme to implement or the related configuration and signaling for the communication scheme.

As described herein, a UE may transmit a message indicating a capability of the UE to support a communication scheme, such as an SDM scheme, an SFN scheme, or a combined SFN and SDM scheme for communications with multi-TRPs (e.g., which may be operating as a base station, a network node, or both). The message may include capability information such as a number of active transmission configuration indicator (TCI) states supported by the UE, a number of potential TCI codepoints supported by the UE for a communication scheme, a number of spatial quasi-colocation (QCL) assumptions or beams capable of being maintained by the UE for processing in a frequency range, or a combination. In some examples, the UE may receive a configuration for a communication scheme from a TRP of the multi-TRPs based on the indicated capability. For example, the TRP may transmit a configuration to the UE identifying an SDM scheme, an SFN scheme, a combined SDM and SFN scheme, and/or another communication scheme based on the capability information. In some examples, the TRP may then transmit an indication of the configuration as a field in control signaling, such as in radio resource control (RRC) signaling or in a downlink control information (DCI) message. The UE may adapt a processing procedure of a received signal based on the identified communication scheme. For example, the UE may perform channel estimation using a common set or separate sets of DMRS ports based on the indicated communication scheme (e.g., an SDM scheme, an SFN scheme and the type of SFN scheme, or a combined SDM and SFN scheme).

Although reference is made to SFN schemes herein, the discussed techniques may be also referred to as single frequency communication schemes, or be or use other communication schemes that use a single frequency signal to communicate with (transmit to or receive from) multiple transmitters.

Aspects of the disclosure are initially described in the context of wireless communications systems. Aspects of the disclosure are further described in the context of communication scheme diagrams and a process flow. Aspects of the disclosure are further illustrated by and described with reference to apparatus diagrams, system diagrams, and flowcharts that relate to techniques for configuring multi-TRP communication schemes.

FIG. 1 illustrates an example of a wireless communications system 100 that supports techniques for configuring multi-transmission reception point communication schemes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, one or more TRPs (e.g., multi-TRPs) may communicate with UEs 115 using a communication scheme, such as an SDM scheme, an FDM scheme, a TDM scheme, or a combination. Additionally or alternatively, the TRPs may perform joint transmissions to a UE 115 using an SFN scheme, which may also be referred to as a single frequency communication scheme. The SFN scheme may be a type of multi-TRP or single-TRP communication scheme in which the downlink frequency bands or channels are shared across TRPs. In some cases, the framework of the SDM scheme and the SFN scheme may be unified such that the UE 115 may support the combined SDM and SFN scheme. For example, the UE 115 may communicate signaling using an SDM scheme or an SFN scheme based on DMRS ports and TCI states. In some examples, there may be one or more common features, common parameters, or both between communications schemes. For example, an SFN scheme may share one or more parameters with an SDM scheme. In some examples, a network (e.g., including one or more TRPs, a base station 105, one or more UEs 115, or a combination) may support multi-TRP communication, single-TRP communication, or both. In some examples of multi-TRP communication, the TRPs may communicate with the one or more UEs 115 using different communication schemes (e.g., the SDM scheme, SFN scheme, or the combined SDM and SFN scheme) to increase spectral efficiency. However, the UE 115 may not know which communication scheme to implement or the related configuration and signaling for the communication scheme.

In some examples, a UE 115 may transmit a message to a TRP in a multi-TRP network that indicates a capability of the UE 115 to support a communication scheme (e.g., an SDM scheme, an SFN scheme, a combined SDM and SFN scheme, or the like). In some examples, the capability message may include components such as a number of active TCI states supported by the UE 115, a number of TCI codepoints that the UE 115 may support for a communication scheme, and a number of simultaneous spatial QCL assumptions or beams the UE 115 is capable of maintaining. The UE 115 may receive a configuration that indicates parameters common to both the SDM scheme and the SFN scheme. In some cases, the UE 115 may receive an indication of a communication scheme from the TRP for communicating. For example, the TRP may indicate an SDM scheme, an SFN scheme, a combined SDM and SFN scheme, or the like for the UE 115 to use for communications between the UE 115 and one or more TRPs. For example, the indication may include one or more parameters specific to an SDM scheme, an SFN scheme, a combined SDM and SFN scheme, or the like. In some examples, the UE 115 may communicate with the one or more TRPs based on the communication scheme indicated by the TRP. For example, the UE 115 may receive signaling from a TRP and may adapt a processing procedure (e.g., a channel estimation procedure) of the received signaling based on the indicated communication scheme.

Figure 2:
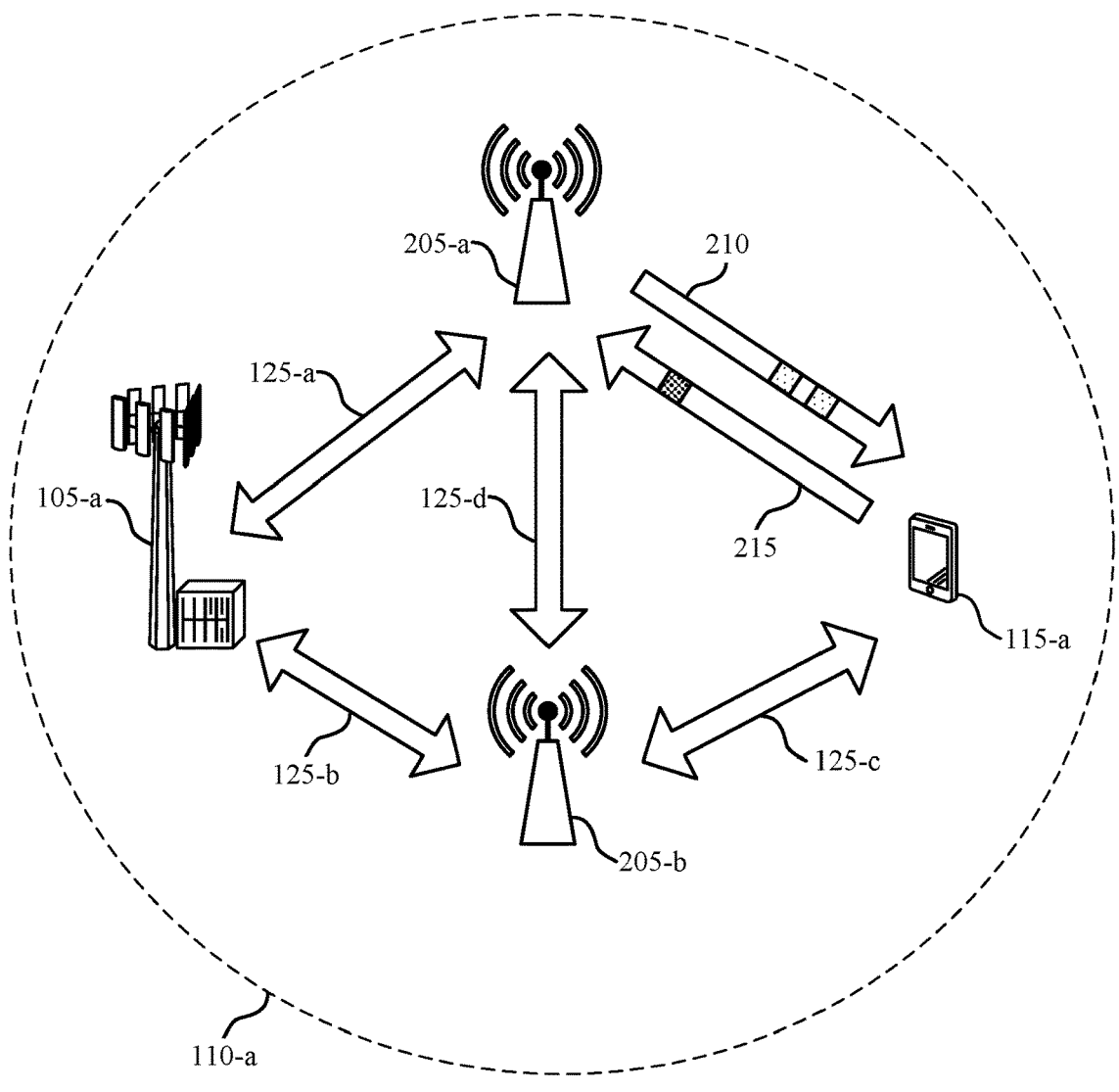

FIG. 2 illustrates an example of a wireless communications system 200 that supports techniques for configuring multi-TRP communication schemes in accordance with aspects of the present disclosure. In some examples, the wireless communications system 200 may implement aspects of the wireless communications system 100 and may include UE 115-*a*, communication link 125-*a* through communication link 125-*d*, and base station 105-*a* with coverage area 110-*a*, which may be examples of a UE 115, communication links 125, and a base station 105 with a coverage area 110 as described with reference to FIG. 1. In some examples, one or more TRPs 205, such as TRP 205-*a*, TRP 205-*b*, or both, may be operating as a base station 105, a network node, or both. For example, TRP 205-*a* may relay signals between UE 115-*a* and base station 105-*a* (e.g., via communication link 125-*a*, downlink communication link 210, uplink communication link 215, or both) or may independently transmit or receive signals from UE 115-*a* (e.g., via downlink communication link 210, uplink communication link 215, or both). Similarly, TRP 205-*b* may relay signals between UE 115-*a* and base station 105-*a* (e.g., via communication link 125-*b*, communication link 125-*c*, or both) or may independently transmit or receive signals from UE 115-*a* (e.g., via communication link 125-*c*). In some cases, UE 115-*a* may transmit a message via uplink communication link 215 to TRP 205-*a* that indicates a capability of UE 115-*a* to support a communication scheme (e.g., an SDM scheme, an SFN scheme, a combined SDM and SFN scheme, or the like) and may receive a configuration from TRP 205-*a* via downlink communication link 210 for communicating according to the communication scheme.

In some examples, TRPs 205 may communicate with one or more UEs 115 using a communication scheme, such as an SDM scheme, an FDM scheme, a TDM scheme, or a combination thereof. The TRPs 205 may coordinate a transmission of a downlink channel (e.g., a physical downlink shared channel (PDSCH), a physical downlink control channel (PDCCH), or both), an uplink channel (e.g., a physical uplink shared channel (PUSCH), a physical uplink control channel (PUCCH), or both), or both. For example, an SDM scheme may involve TRP 205-*a* and TRP 205-*b* performing a joint transmission over a same resource (e.g., over a same set of resource elements and OFDM symbols) based on transmitting different layers, such as spatial layers, with different TCI states, which is described in further detail with respect to FIG. 3. Additionally or alternatively, an FDM scheme may involve TRP 205-*a* and TRP 205-*b* performing the joint transmissions over different frequency resources and overlapping time resources, such as over different sets of resource elements but over a same set of OFDM symbols, based on transmitting different sets of frequency-domain resources (e.g., resource elements) with different TCI states. In some examples of a TDM scheme, TRP 205-*a* and TRP 205-*b* may perform the joint transmissions over different time resources and overlapping frequency resources, such as over different sets of OFDM symbols and overlapping set of resource elements, based on transmitting different sets of time-domain resources (e.g., OFDM symbols, slots, or mini-slots) with different TCI states.

In some examples, TRP 205-*a* and TRP 205-*b* may perform joint transmissions to UE 115-*a* using an SFN scheme, which may also be referred to as a single frequency communication scheme. The SFN scheme may be a type of multi-TRP or single-TRP communication scheme in which the downlink communication link 210 and a downlink portion of communication link 125-*c* may include the same frequency bands or channel. For example, TRP 205-*a* and TRP 205-*b* may transmit a same transmission over the same downlink communication link 210 according to an SDM scheme, an FDM scheme, a TDM scheme, an SFN scheme, or the like, where the downlink transmission is associated with two TCI states corresponding to the two TRPs 205. In other words, the downlink communication link 210 may be or be part of an "SFNed" downlink communication link. TRP 205-*a* and TRP 205-*b* may perform joint transmissions to UE 115-*a* according to various types of SFN communication schemes, such as an SFN communication scheme 0, an SFN communication scheme 1, or an SFN communication scheme 2, which is described in further detail with respect to FIG. 4. UE 115-*a* may process received signals from one or more TRPs 205 non-jointly (e.g., by not layer splitting in SDM cases and not joint precoding). Receiving UE 115-*a* may use macro diversity or frequency diversity gain to assist in receiving signals from the multiple spatially dispersed TRPs 205. In some cases, one or more TRPs 205 configured to use SFN may use beamforming to transmit a signal over one or more beams and may alternatively or additionally transmit a signal in an area, direction, or both. In some examples, the UE 115 may use an SFN scheme if the UE 115 has relatively high mobility, such as a high speed train. Further, SFN communications may be useful for some service types, such as broadcast or multicast services.

In some examples, the framework of the SDM scheme and the SFN scheme may be unified such that the UE 115 may support the combined SDM and SFN scheme. For example, the UE 115 may communicate signaling using an SDM scheme or an SFN scheme based on DMRS ports and TCI states. The UE 115 may have multiple DMRS ports, each DMRS port configured with one or more TCI states. The UE 115 may use an SFN scheme for communications across multiple TCI states and an SDM scheme for communications across one or more DMRS ports. For example, the UE 115 may have a DMRS Port 0 configured with TCI states 1 and 2 and a DMRS Port 1 configured with TCI states 3 and 4. The UE 115 may apply an SFN scheme to communications across TCI states 1 and 2, which may be referred to as SFNed layer 0, and to communications across TCI states 3 and 4, which may be referred to as SFNed layer 1. The UE 115 may use an SDM scheme for communications across the DMRS ports (e.g., to transmit or receive communications associated with DMRS Port 0, or SFNed layer 0, and DMRS Port 1, or SFNed layer 1). In some other examples, the UE 115 may have a DMRS Port 0 configured with TCI state 1, a DMRS Port 1 configured with TCI states 1 and 2, and a DMRS port 3 configured with TCI state 2. The UE 115 may apply an SFN scheme to communications across TCI states 1 and 2 associated with DMRS Port 1. The UE 115 may use an SDM scheme for communications across the DMRS ports (e.g., to transmit or receive communications associated with DMRS Port 0, DMRS Port 1, and DMRS Port 3).

In some examples, there may be one or more common features, common parameters, or both between communications schemes. For example, an SFN scheme may share one or more parameters with an SDM scheme. For each communication scheme, a UE 115 may determine one or more TRPs 205 participating in a transmission based on a frequency range (e.g., Frequency Range 2 (FR2), which may include frequency bands from 24.25 GHz to 52.6 GHz) and based on two or more TCI states being mapped to a single codepoint indicated by a scheduling DCI for the UE 115. In some other examples, each communication scheme may have one or more different features including a configurability of the UE 115, or other devices, a different range of parameters (e.g., a number of DMRS ports for each TRP 205, which may be different in an SDM scheme or the same for an SFN scheme).

In some examples, a network (e.g., including one or more TRPs 205, a base station 105, one or more UEs 115, or a combination) may support multi-TRP communication, single-TRP communication, or both. For example, as illustrated in wireless communications system 200, TRP 205-*a*, TRP 205-*b*, or both may perform a joint transmission of signaling to UE 115-*a*, may independently communicate with UE 115-*a* (e.g., may perform a non-joint transmission), or both. In some examples of multi-TRP communication, the TRPs 205 may communicate with the one or more UEs 115 using different communication schemes (e.g., the SDM scheme, SFN scheme, or the combined SDM and SFN scheme) to increase spectral efficiency. However, the UE 115 may not know which communication scheme to implement or the related configuration and signaling for the communication scheme.

In some examples, a UE 115 may transmit a message to a TRP 205 in a multi-TRP network that indicates a capability of the UE 115 to support a communication scheme (e.g., an SDM scheme, an SFN scheme, a combined SDM and SFN scheme, or the like) and may receive a configuration from the TRP 205 for communicating according to the communication scheme. For example, UE 115-*a* may transmit a capability message 220 to TRP 205-*a* via the uplink communication link 215. In some cases, TRP 205-*a* may transmit the capability message 220 to other TRPs 205 (e.g., to TRP 205-*b*), the base station 105-*a*, other network nodes, or a combination using communication link 125-*a*, communication link 125-*d*, or other communication links 125, respectively. The capability message 220 may indicate a supported communication scheme (e.g., a supported spatial-domain multi-TRP mode). In some examples, the capability message 220 may include components such as a maximum number of active TCI states supported by UE 115-*a*, one or more potential TCI codepoints that UE 115-*a* may support for a communication scheme, and a maximum number of simultaneous spatial QCL assumptions or beams UE 115-*a* is capable of maintaining (e.g., based on a number of ports used for processing in a frequency range (e.g., FR2)). In some examples, the spatial QCL assumptions or beams may be QCL-TypeD information, which may be based on one or more spatial receiver parameters (e.g., angle of arrival (AoA) at UE 115-*a*). The number of QCL-TypeD information may be based on one receive antenna panel or two receive antenna panels for an SDM scheme or an SFN scheme, respectively.

In some cases, TRP 205-*a* may transmit a parameters configuration 225 to UE 115-*a* via downlink communication link 210. For example, the parameters configuration 225 may include one or more parameters for an SDM scheme, an SFN scheme, a combined SDM and SFN scheme, or the like. The one or more parameters may be common to both the SDM scheme and the SFN scheme. In some examples, TRP 205-*a* may transmit a communication scheme indication 230 to UE 115-*a* via downlink communication link 210 based on the capability message 220. The communication scheme indication 230 may indicate an SDM scheme, an SFN scheme, a combined SDM and SFN scheme, or the like, for UE 115-*a* to use for communications between UE 115-*a* and TRP 205-*a*. For example, the communication scheme indication 230 may include one or more parameters specific to the communication scheme.

In some examples, TRP 205-*a* may transmit the communication scheme indication 230 as a field in control signaling (e.g., including a parameter for a mode indication, where the mode includes operating using an SDM scheme, an SFN scheme 1, an SFN scheme 2, or others). In some cases, TRP 205-*a* may transmit the communication scheme indication 230 in higher layer signaling, such as in RRC signaling. In some other cases, TRP 205-*a* may dynamically transmit the communication scheme indication 230 in a DCI message. TRP 205-*a* may explicitly indicate a communication scheme using a new or re-purposed DCI field or may implicitly indicate a communication scheme by mapping the communication scheme to a DCI field (e.g., a time domain resource assignment (TDRA) field may indicate a TDRA table entry associated with a communication scheme). For example, UE 115-*a* may receive an explicit indication of the communication scheme in the DCI message from TRP 205-*a*. The communication scheme indication 230 may include a value for the TDRA table field of the DCI message that indicates an entry of the TDRA table that may be associated with the communication scheme. The communication scheme indication 230 may include a value of a TCI field of the DCI message that indicates multiple TCI states. In some cases, UE 115-*a* may determine the communication scheme indication 230 indicates an SDM scheme based on an antenna port field of the DCI message indicating multiple code division multiplexing (CDM) groups. In some other cases, UE 115-*a* may determine the communication scheme indication 230 is for an SFN scheme based on the antenna port field of the DCI message indicating a single CDM group.

In some examples, UE 115-*a* may communicate with one or more TRPs 205, such as TRP 205-*a* based on the communication scheme indicated in the communication scheme indication 230. For example, UE 115-*a* may receive signaling from TRP 205-*a* and may adapt a processing procedure of the received signaling based on the indicated communication scheme. In some examples, UE 115-*a* may adapt a channel estimation scheme, which may be based on the identified communication scheme in parameters configuration 225. For example, if the communication scheme is an SDM scheme, UE 115-*a* may perform channel estimation on a received signal based on Equation 1:

$$Y = [H_a W_a \quad H_b W_b ] \begin{bmatrix} X_a \\ X_b \end{bmatrix} + I + N$$

where $H_a$ is a channel matrix and $W_a$ is a precoder matrix for a channel from TRP 205-*a*, $H_b$ is a channel matrix and $W_b$ is a precoder matrix for a channel from TRP 205-*b*, I is an identity matrix, and N is a noise matrix. In SDM, UE 115-*a* may estimate precoded channel matrices $H_a W_a$ and $H_b W_b$ for data decoding separately using separate sets of DMRS ports.

In some other examples, if the communication scheme is an SFN scheme, UE 115-*a* may perform channel estimation on a received signal based on Equation 2:

$$Y = (H_a W_a + H_b W_b) X + I + N$$

where $H_a$ is a channel matrix and $W_a$ is a precoder matrix for a channel from TRP 205-*a*, $H_b$ is a channel matrix and $W_b$ is a precoder matrix for a channel from TRP 205-*b*, I is an identity matrix, and N is a noise matrix. For SFN scheme 1, UE 115-*a* may estimate matrices such as $H_a W_a$ and $H_b W_b$ for an effective channel (e.g., $H_a W_a + H_b W_b$) using a common set of DMRS ports. UE 115-*a* may use the estimated matrices or the effective channel for data decoding. For SFN scheme 2, UE 115-*a* may estimate precoded channel matrices $H_a W_a$ and $H_b W_b$ for the effective channel separately using separate sets of DMRS ports. UE 115-*a* may use the estimated matrices or the effective channel for data decoding.

Figure 3:
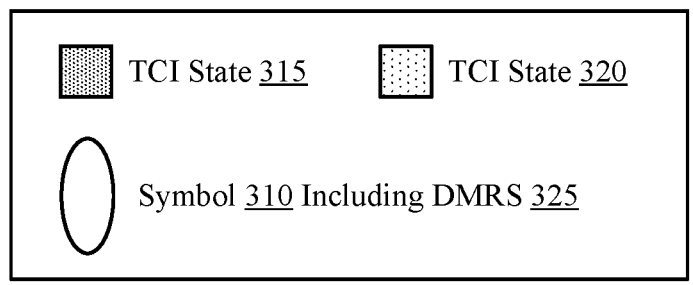
FIGS. 3 and 4 illustrate examples of communication scheme diagrams that support techniques for configuring multi-TRP communication schemes in accordance with aspects of the present disclosure.
Figure 3:
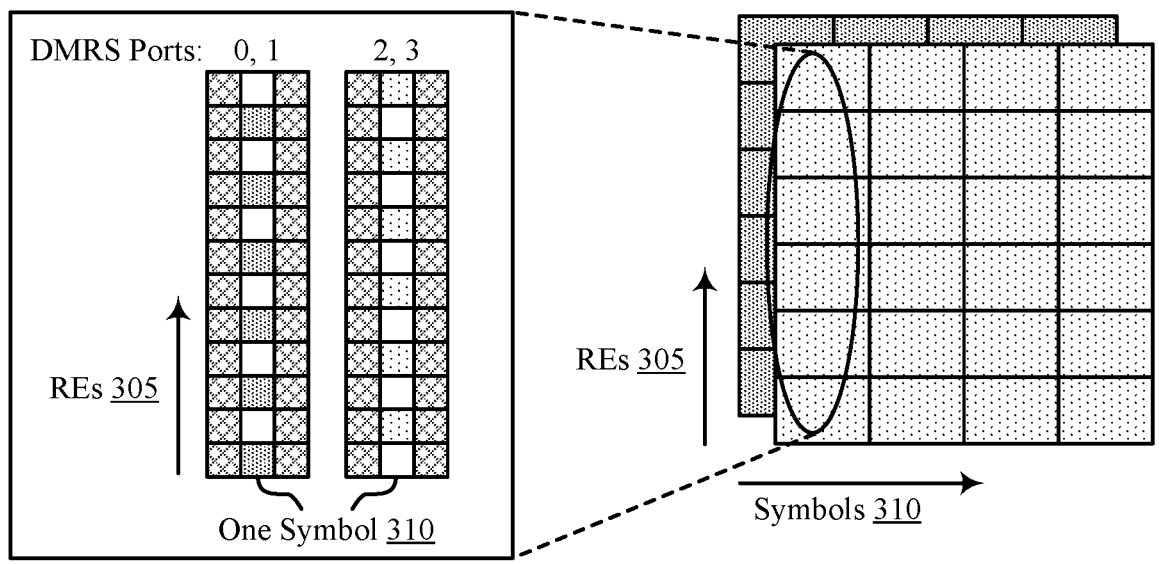

FIG. 3 illustrates an example of a communication scheme diagram 300 that supports techniques for configuring multi-TRP communication schemes in accordance with aspects of the present disclosure. In some examples, the communication scheme diagram 300 may be implemented to realize aspects of the wireless communications system 100 or the wireless communications system 200. For example, one or more TRPs 205 (e.g., multi-TRPs 205) and UEs 115 may employ an SDM scheme illustrated by communication scheme diagram 300 as described with reference to FIGS. 1 and 2. A UE 115 may transmit a capability for supporting one or more communication schemes (e.g., an SFN scheme, the SDM scheme, or a combined SDM and SFN scheme) to the one or more TRPs 205. A TRP 205 of the one or more TRPs 205 may transmit a configuration including one or more parameters common to a set of communication schemes (e.g., including the SDM scheme) and an indication to a UE 115 to use a particular communication (e.g., the SDM scheme, SFN scheme, joint SDM and SFN scheme) based on receiving the capability message from the UE 115. The communication scheme diagram 300 may illustrate joint downlink transmissions to the UE 115 from a first TRP 205 applying a TCI state 315 and from a second TRP 205 applying a TCI state 320.

For example, in a single-DCI based multi-TRP design, a single PDCCH (e.g., a single NR-PDCCH) may schedule a single PDSCH (e.g., a single NR-PDSCH) and various communication schemes may be applied by the multi-TRPs 205, such as the SDM scheme illustrated in communication scheme diagram 300. In some cases, the multi-TRPs 205 may apply an SDM scheme in which the different TRPs 205 may transmit different spatial layers in overlapping resource elements 305 and symbols 310. In such cases, the multi-TRPs 205 may transmit different layers with different TCI states. For example, the first TRP 205 may transmit a first layer with the TCI state 315 and the second TRP 205 may transmit a second layer with the TCI state 320. The first symbol 310 of each layer transmitted by a different TRP 205 (and likewise transmitted according to a different TCI state) may include a DMRS 325 (e.g., the first symbol 310 including the DMRS 325 may be a same symbol for both the first TRP and the second TRP when using SDM schemes).

Further, for the transmission of the DMRS 325 in examples in which the first TRP 205 and the second TRP 205 transmit according to the SDM scheme, the resource elements 305 to which the TRPs 205 may map DMRS ports may be configured according to a frequency hopping pattern such that the DMRS ports associated with a first set of layers transmitted by the first TRP 205 with the TCI state 315 do not occupy the same resource elements 305 as the DMRS ports associated with a second set of layers transmitted by the second TRP 205 with the TCI state 320. For example, the first TRP 205 may transmit DMRS ports 0, 1 over a first set of resource elements 305 with the TCI state 315 and the second TRP 205 may transmit DMRS ports 2, 3 over a second set of resource elements 305 with the TCI state 320 such that the first set of resource elements 305 and the second set of resource elements 305 do not occupy the same resource elements 305.

As shown by the SDM scheme in communication scheme diagram 300, the first TRP 205 and the second TRP 205 may transmit over sets of resource elements 305 and symbols 310. In some cases, a resource block may include 12 resource elements 305 such that, in some aspects, the first TRP 205 and the second TRP 205 may also be understood as transmitting over resource blocks (or sets of resource blocks) and symbols 310. In the depicted example, there are four layers and four DMRS ports, where each port corresponds to one layer. In an example, each DMRS port may correspond to one layer, such that the DMRS ports 0, 1 may be associated with the TCI state 315 and correspond to a first two layers and the DMRS ports 2, 3 may be associated with the TCI state 320 correspond to a next two layers. Data layers (unlike DMRS ports) may be mapped to the same resource elements 305, such that each data resource element 305 includes all four layers (e.g., the first two layers and the next two layers).

In some examples, a UE 115 may receive a configuration from a TRP 205 that indicates a set of parameters common to the SDM scheme and an SFN scheme. In some examples, the configuration may also include one or more parameters specific to the SDM scheme and/or the SFN scheme or schemes. The UE 115 may receive an indication of a communication scheme from the TRP 205 indicating the SDM scheme illustrated in communication scheme diagram 300. The UE 115 may determine a set of parameters for communication with the multi-TRPs 205 specific to the SDM communication scheme. The UE 115 may receive signaling from one or more TRPs 205 and may process the signaling according to the SDM scheme. For example, the UE 115 may perform channel estimation based on the SDM scheme.

Figure 4:
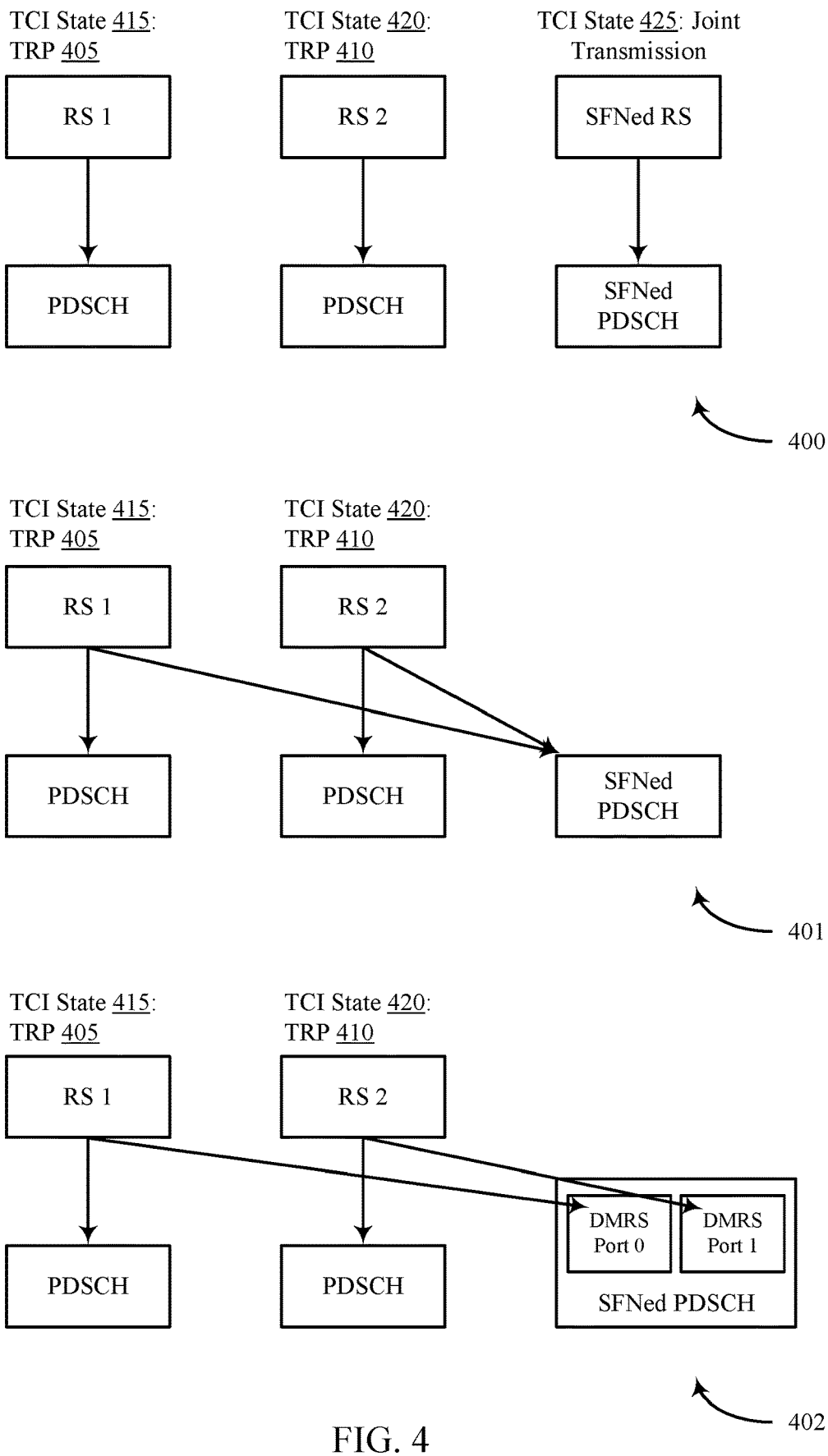

FIG. 4 illustrates examples of communication scheme diagrams 400, 401, and 402 that support techniques for configuring multi-TRP communication schemes in accordance with aspects of the present disclosure. In some examples, the communication scheme diagrams 400, 401, and 402 may be implemented to realize aspects of the wireless communications system 100 or the wireless communication system 200. For example, TRP 405, TRP 410, or both, which may be examples of TRPs 205 as described with reference to FIG. 2 (e.g., multi-TRPs 205), and UEs 115 may employ one or more SFN schemes illustrated by communication scheme diagrams 400, 401, and 402 as described with reference to FIGS. 1 and 2. A UE 115 may transmit a capability for supporting one or more communication schemes (e.g., the SFN schemes, the SDM scheme, or a combined SDM and SFN scheme) to the one or more TRPs 205. A TRP 205 of the one or more TRPs 205 may transmit a configuration including one or more parameters common to a set of communication schemes (e.g., including the SDM scheme). In some cases, TRP 405, TRP 410, or both may transmit an indication to a UE 115 to use an SFN scheme of the SFN schemes based on receiving the capability message from the UE 115. In some cases, the communication scheme diagrams 400, 401, and 402 may illustrate joint downlink transmissions to the UE 115 from a TRP 405 applying a TCI state 415 and from a TRP 410 applying a TCI state 420.

The communication scheme diagram 400 illustrates an SFN scheme 0. In some aspects, the SFN communication 0 may also refer to a transparent SFN scheme. In some examples, the TRP 405 and the TRP 410 may each transmit two separate reference signals (e.g., a reference signal 1 (RS 1) and a reference signal 2 (RS 2), respectively) and each separate reference signal may be associated with a different PDSCH. As such, to achieve an "SFNed" PDSCH, the TRP 405 and the TRP 410 may define an additional TCI state, such as a TCI state 425, that may be used to transmit an "SFNed" reference signal associated with an "SFNed" PDSCH. The "SFNed" PDSCH in the SFN communication 0 may include DMRS ports and data layers that are associated with the additional TCI state 425.

The communication scheme diagram 401 illustrates an SFN scheme 1. In such an SFN scheme 1, the TRP 405 and the TRP 410 may transmit two separate reference signals (e.g., an RS 1 and an RS 2, respectively) and each of the two reference signals may be associated with a different PDSCH and also with a joint "SFNed" PDSCH in which each DMRS port or data layer of the "SFNed" PDSCH is associated with both the TCI state 415 and the TCI state 420. In other words, the TRP 405 and the TRP 410 may transmit reference signals (such as TRSs) in a TRP-specific or non-SFN manner while the associated DMRS and PDCCH or PDSCH from the TRPs are transmitted in an SFN manner.

The Communication scheme diagram 402 illustrates an SFN scheme 2. In such an SFN scheme 2, the TRP 405 and the TRP 410 may transmit two separate reference signals (e.g., an RS 1 and an RS 2, respectively) and each of the two reference signals may be associated with a different PDSCH and also with a joint PDSCH in which each data layer of the joint PDSCH is associated with the TCI state 415 and the TCI state 420 while each DMRS port of the joint PDSCH is associated with either the TCI state 415 or the TCI state 420 (e.g., not both). For example, a DMRS port 0 of the joint PDSCH may be associated with the TCI state 415 (and not with the TCI state 420) and a DMRS port 1 of the joint PDSCH may be associated with the TCI state 420 (and not with the TCI state 415). In other words, the TRP 405 and the TRP 410 may transmit reference signals (such as TRSs) and DMRS in a TRP-specific or non-SFN manner while the associated with PDSCH (e.g., data layers) from the TRPs is transmitted in an SFN manner.

In some examples, a UE 115 may receive a configuration from a TRP 205 that indicates a set of parameters common to the SDM scheme and an SFN scheme. The UE 115 may receive an indication of a communication scheme from the TRP 205 indicating one of SFN scheme 0, SFN scheme 1, or SFN scheme 2 illustrated in communication scheme diagram 400 through communication scheme diagram 402, respectively. The UE 115 may determine a set of parameters for communication with TRP 405, TRP 410, or both specific to the SFN scheme. For example, the indication of the communication scheme may include one or more parameters specific to the SFN scheme. The UE 115 may receive signaling from TRP 405, TRP 410, or both and may process the signaling according to the SDM scheme. For example, the UE 115 may perform channel estimation based on the SDM scheme.

Figure 5:
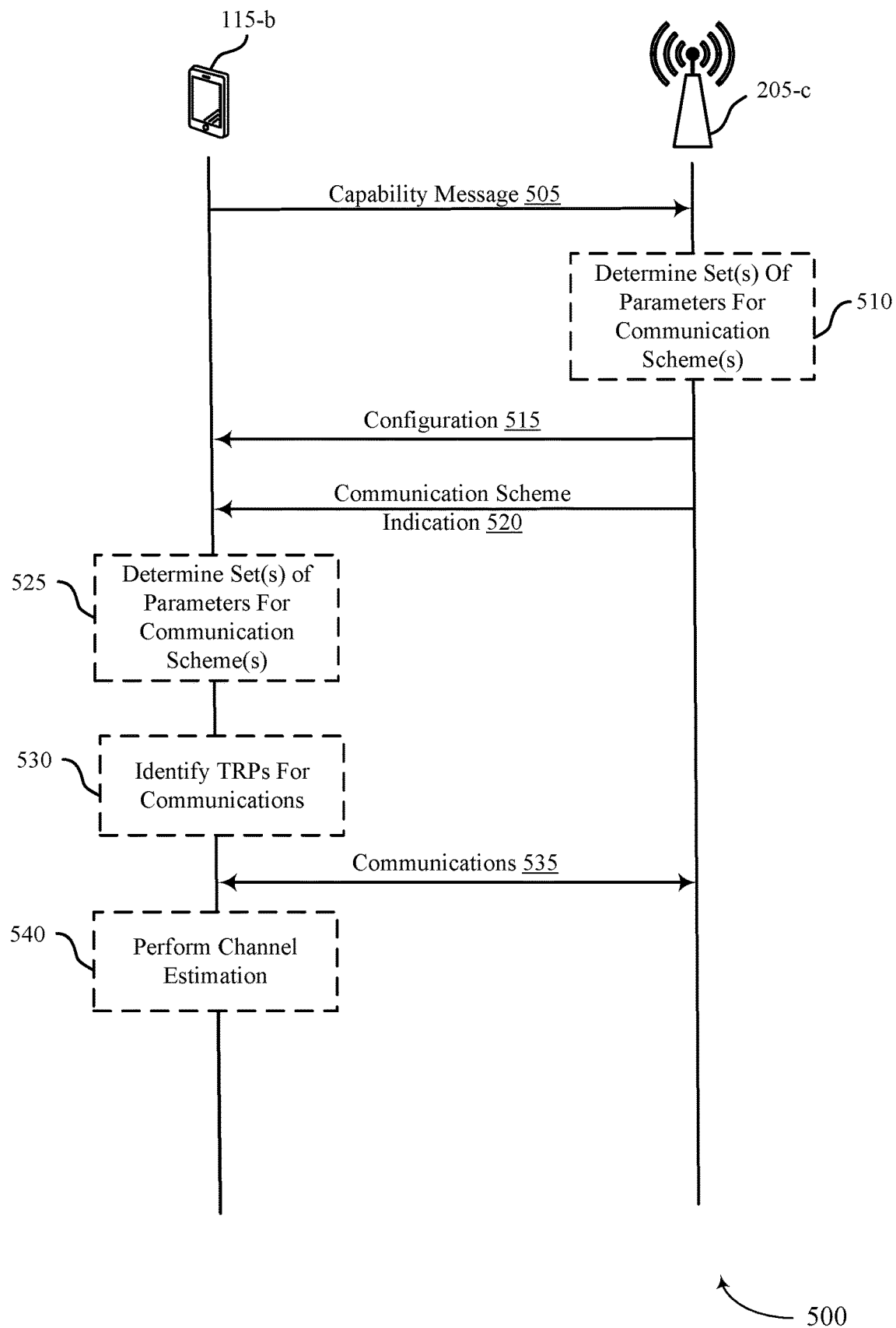
FIG. 5 illustrates an example of a process flow that supports techniques for configuring multi-TRP communication schemes in accordance with aspects of the present disclosure.

FIG. 5 illustrates an example of a process flow 500 that supports techniques for configuring multi-TRP communication schemes in accordance with aspects of the present disclosure. In some examples, process flow 500 may implement aspects of wireless communications system 100, wireless communications system 200, communication scheme diagrams 300, communication scheme diagram 400 through communication scheme diagram 402, or a combination. The process flow 500 may illustrate an example of a TRP 205, such as TRP 205-b, configuring a UE 115, such as UE 115-b, with a set of parameters common for an SDM scheme and an SFN scheme and indicating to the UE 115 to use one of the SDM scheme, the SFN scheme, or a combined SDM and SFN scheme for communications with multi-TRPs. Alternative examples of the following may be implemented, where some processes are performed in a different order than described or are not performed. In some cases, processes may include additional features not mentioned below, or further processes may be added.

At 505, UE 115-b may transmit a message that indicates a capability of UE 115-b to support an SDM scheme, an SFN scheme (e.g., which may be referred to as a single frequency communication scheme), or a combined SDM and SFN scheme for communications with multi-TRPs. For example, the message may include a set of capabilities including a number of Spatial QCL assumptions or beams capable of being maintained by UE 115-b, a number of TCI states supported by UE 115-b, a number of TCI codepoints supported by UE 115-b, or any combination thereof, for one or both of the SDM scheme and the SFN scheme.

At 510, TRP 205-c may determine one or more sets of parameters for the SDM scheme, the SFN scheme, the combined SDM and SFN scheme, or a combination. For example, TRP 205-c may determine a common set of parameters between the SDM scheme and the SFN scheme. Additionally or alternatively, TRP 205-c may determine a set of parameters for each communication scheme (e.g., specific to each communication scheme).

At 515, TRP 205-c may transmit a configuration to UE 115-b including an indication of at least one set of parameters of the determined one or more sets of parameters. For example, TRP 205-c may include an indication of the common set of parameters, the set of parameters for a communication scheme, or both. In some examples, TRP 205-c may select the set of parameters for the communication scheme based on the capability message 505. That is, if UE 115-b is capable of supporting an SDM scheme, TRP 205-c may include an indication of a set of parameters for the SDM scheme. Similarly, if UE 115-b is capable of supporting an SFN scheme or a combined SDM and SFN scheme, TRP 205-c may include an indication of a set of parameters for the SFN scheme or the combined SDM and SFN scheme.

At 520, UE 115-b may receive an indication of a communication scheme (e.g., an SDM scheme, an SFN scheme including type, a combined SDM and SFN scheme, or the like). In some cases, UE 115-b may use the communication scheme for communicating with the multi-TRPs. In some examples, UE 115-b may receive the communication scheme indication at 520 in a mode indicator field of an RRC message. In some examples, UE 115-b may receive the communication scheme indication at 520 in a DCI message. In some cases, UE 115-b may receive an explicit indication of the communication scheme in the DCI message. For example, the indication of the communication scheme at 520 may include a value for a TDRA table field of the DCI message that indicates an entry of a TDRA table that may be associated with the communication scheme. In some other examples, the indication of the communication scheme at 520 may include a value of a TCI field of the DCI message that indicates multiple TCI states. In some cases, UE 115-b may determine the communication scheme indication at 520 is for an SFN scheme based on an antenna port field of the DCI message indicating multiple CDM groups. In some other cases, UE 115-b may determine the communication scheme indication at 520 is for an SDM scheme based on the antenna port field of the DCI message indicating a single CDM group.

At 525, UE 115-d may determine one or more sets of parameters for the SDM scheme, the SFN scheme, the combined SDM and SFN scheme, or a combination. For example, UE 115-b may receive an indication of a common set of parameters between the SDM scheme and the SFN scheme in the indication at 515, and may additionally or alternatively, UE 115-b receive an indication of a set of parameters specific to the communication scheme indicated at 520 (e.g., specific to the SDM scheme, the SFN scheme, or the combined SDM and SFN scheme). UE 115-b may receive the set of parameters specific to the communication scheme in the configuration at 515, the communication scheme at 520, or a combination of both.

At 530, UE 115-b may determine which TRPs 205 to communicate with of the multi-TRPs 205 based on two or more TCI states being mapped to a TCI codepoint for each TRP 205 UE 115-b communicates with. In some examples, UE 115-b may determine a communication scheme to use based on an association between a set of parameters indicated in the configuration at 515 and the communication scheme at 520.

At 535, UE 115-b may communicate with multi-TRPs 205, which may include TRP 205-c based on the communication scheme indicated at 520. For example, UE 115-b may communicate with the multi-TRPs based on the set of parameters that may be common to the communication schemes, the set of parameters that may be specific to the communication scheme, or both. In some cases, UE 115-b may receive signaling from the multi-TRPs, a network node, or both based on the communication schemes (e.g., the SDM scheme, the SFN scheme, the combined SDM and SFN scheme, or a combination). In some examples, UE 115-b may determine a configurability value, a number of DMRS ports from each TRP 205, or both based on the communication scheme. UE 115-b may receive the signaling from TRP 205-c based on the configurability value or the number of DMRS ports.

At 540, UE 115-b may perform channel estimation on signaling received at 535. For example, UE 115-b may perform channel estimation using multiple sets of DMRS ports for respective TRPs 205 based on TRP 205-c indicating one of an SDM scheme or a second type of SFN scheme (e.g., SFN Scheme 2 as described with reference to FIG. 4). In some other examples, UE 115-b may perform channel estimation using a common set of DMRS ports for respective TRPs 205 based on TRP 205-c indicating a first type of SFN scheme (e.g., SFN Scheme 1 as described with reference to FIG. 4)

Figure 6:
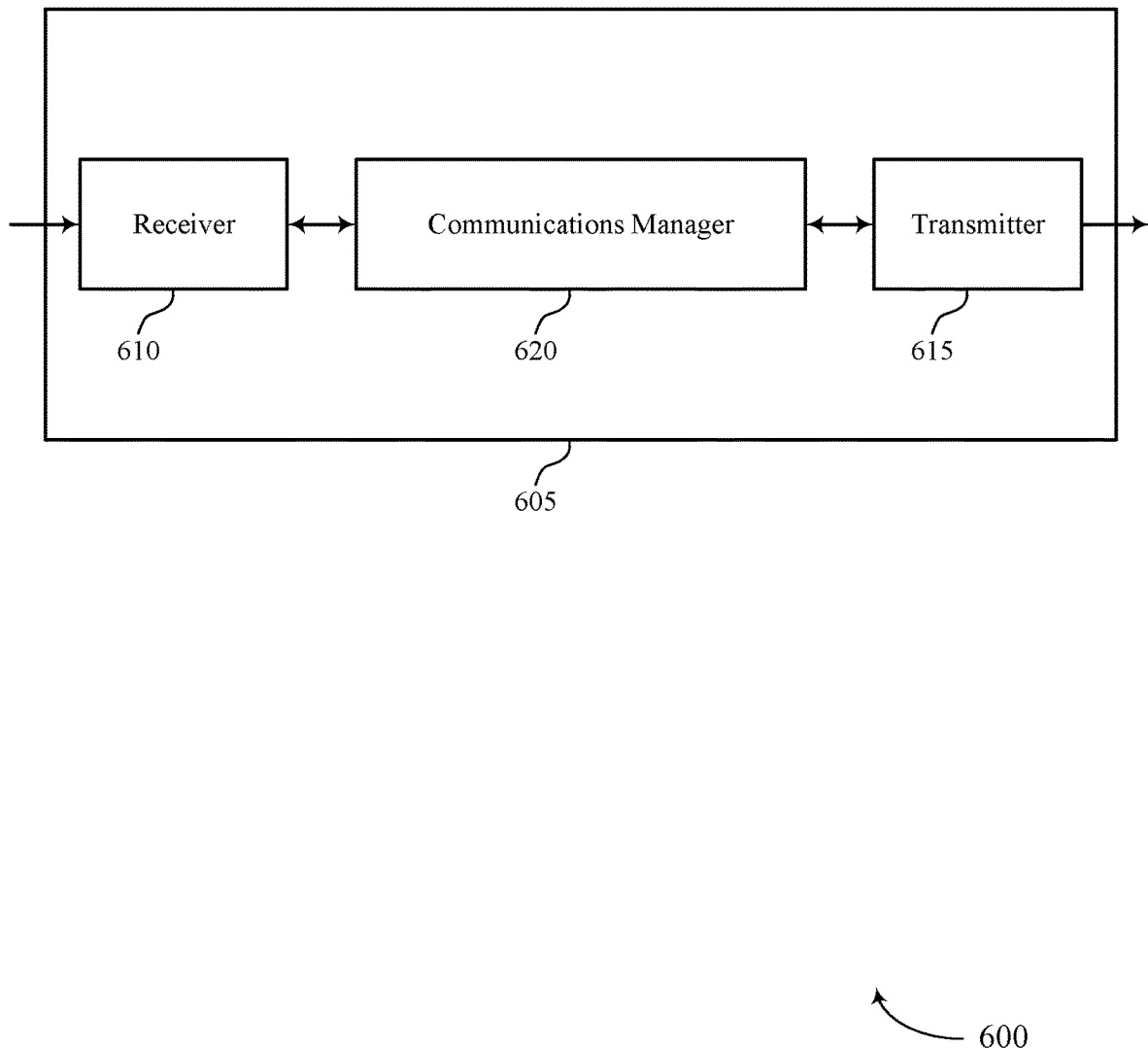
FIGS. 6 and 7 show block diagrams of devices that support techniques for configuring multi-TRP communication schemes in accordance with aspects of the present disclosure.

FIG. 6 shows a block diagram 600 of a device 605 that supports techniques for configuring multi-TRP communication schemes in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring multi-TRP communication schemes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring multi-TRP communication schemes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for configuring multi-TRP communication schemes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving a configuration that indicates parameters for an SDM scheme and an SFN scheme supported by the UE for communicating with multi-TRPs, the parameters including a first set of parameters common to both the SDM scheme and the SFN scheme. The communications manager 620 may be configured as or otherwise support a means for receiving an indication of a communication scheme for the UE to use for communications with the multiple TRPs, the communication scheme including the SDM scheme, the SFN scheme, or a combination of the SDM scheme and the SFN scheme. The communications manager 620 may be configured as or otherwise support a means for communicating with the multiple TRPs using the parameters of the received configuration that correspond to the indicated communication scheme.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources based on a TRP 205 indicating a communication scheme and a set of parameters for a UE 115 to use for communications with multi-TRPs 205.

Figure 7:
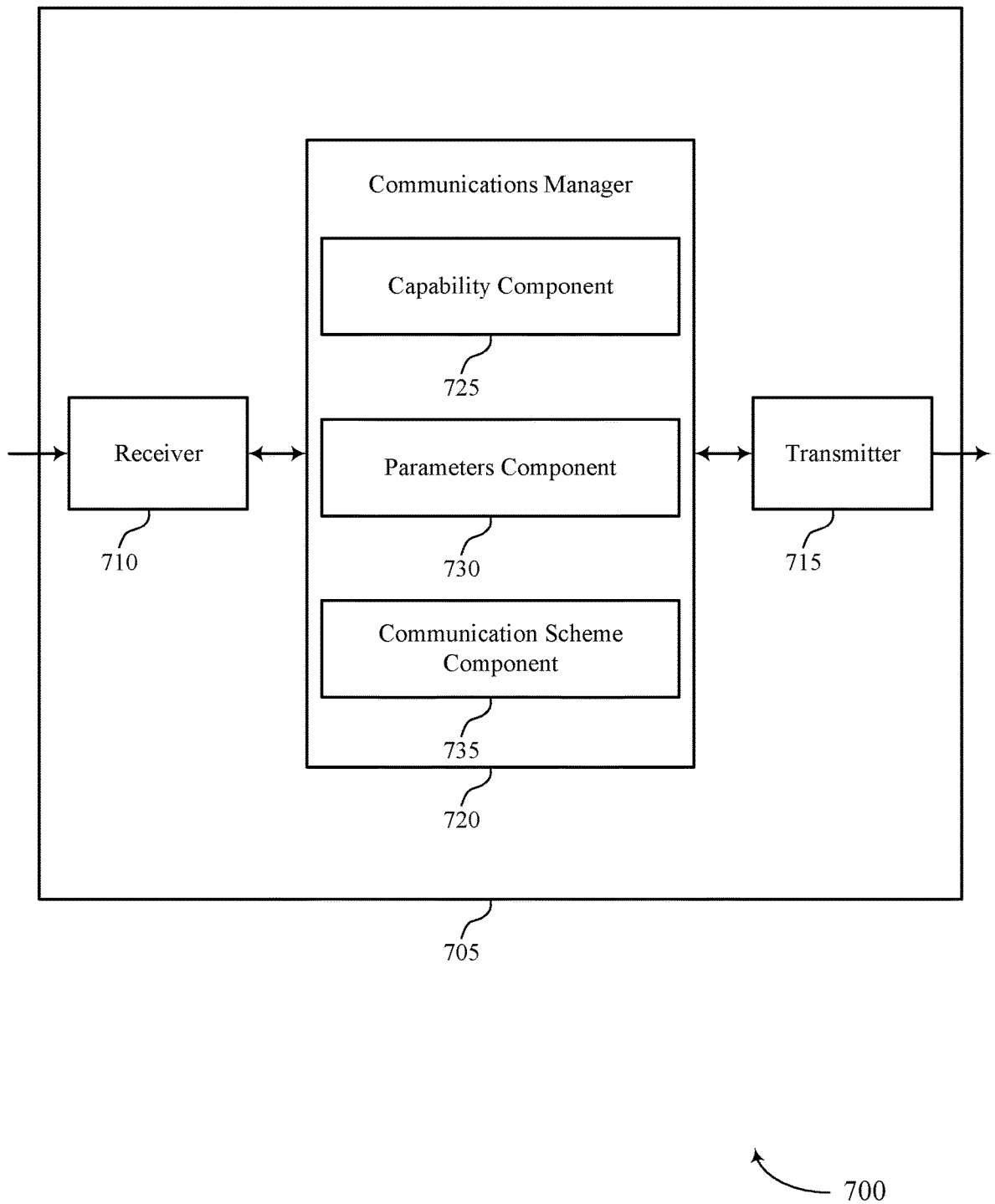

FIG. 7 shows a block diagram 700 of a device 705 that supports techniques for configuring multi-TRP communication schemes in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for configuring multi-TRP communication schemes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for configuring multi-TRP communication schemes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for configuring multi-TRP communication schemes as described herein. For example, the communications manager 720 may include a capability component 725, a parameters component 730, a communication scheme component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The capability component 725 may be configured as or otherwise support a means for transmitting a message that indicates a capability of the UE to support an SDM scheme and an SFN scheme for communicating with multiple TRPs. The parameters component 730 may be configured as or otherwise support a means for receiving a configuration that indicates parameters for the SDM scheme and the SFN scheme, the parameters including a first set of parameters common to both the SDM scheme and the SFN scheme. The communication scheme component 735 may be configured as or otherwise support a means for receiving an indication of a communication scheme for the UE to use for communications with the multiple TRPs, the communication scheme including the SDM scheme, the SFN scheme, or a combination of the SDM scheme and the SFN scheme. The communication scheme component 735 may be configured as or otherwise support a means for communicating with the multiple TRPs using the parameters of the received configuration that correspond to the indicated communication scheme.

Figure 8:
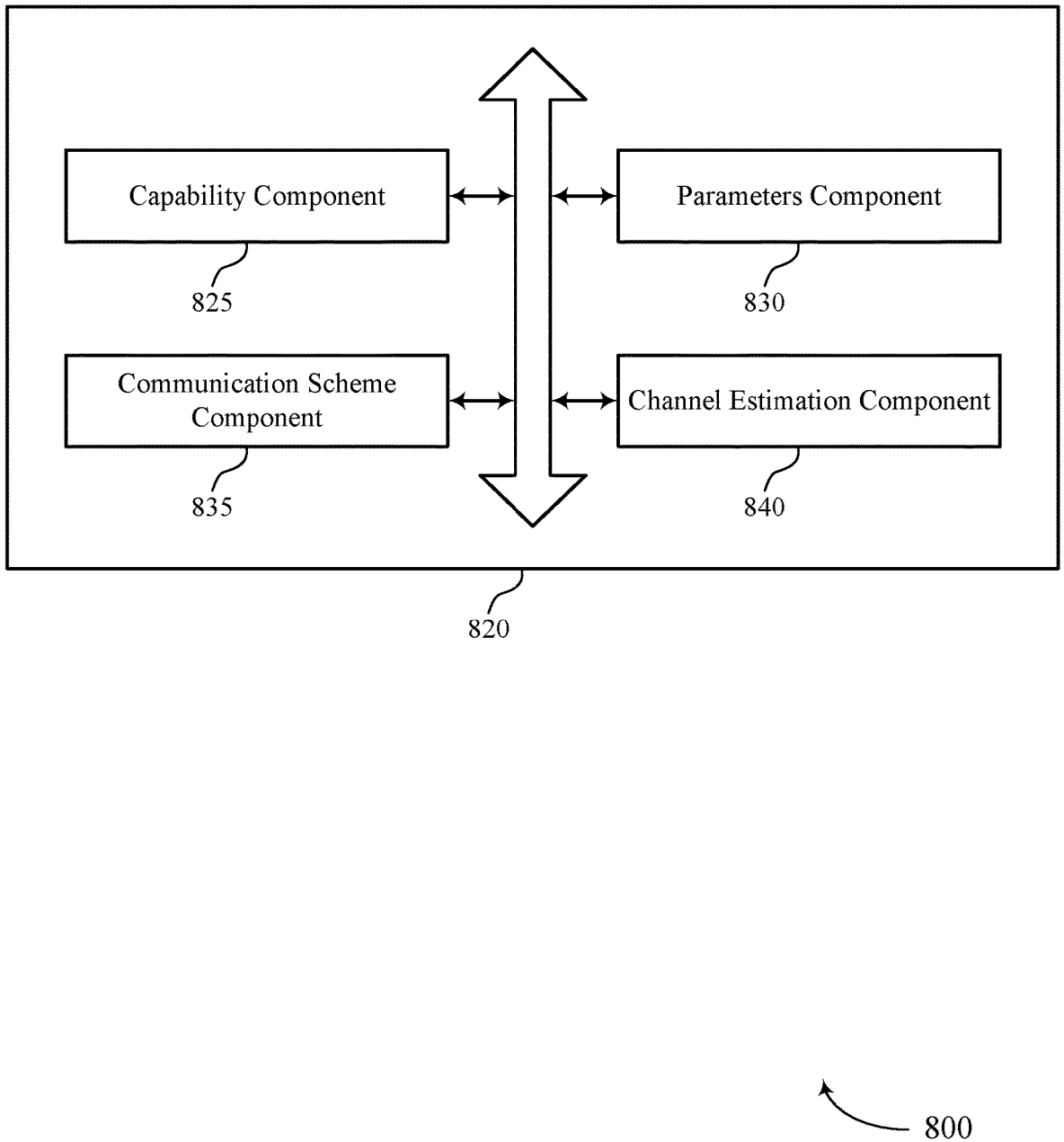
FIG. 8 shows a block diagram of a communications manager that supports techniques for configuring multi-TRP communication schemes in accordance with aspects of the present disclosure.

FIG. 8 shows a block diagram 800 of a communications manager 820 that supports techniques for configuring multi-TRP communication schemes in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for configuring multi-TRP communication schemes as described herein. For example, the communications manager 820 may include a capability component 825, a parameters component 830, a communication scheme component 835, a channel estimation component 840, or any combination thereof. Each of these components may communicate, directly or indirectly, with one another (e.g., via one or more buses).

The communications manager 820 may support wireless communications at a UE in accordance with examples as disclosed herein. The capability component 825 may be configured as or otherwise support a means for transmitting a message that indicates a capability of the UE to support an SDM scheme and an SFN scheme for communicating with multiple TRPs. The parameters component 830 may be configured as or otherwise support a means for receiving a configuration that indicates parameters for the SDM scheme and the SFN scheme, the parameters including a first set of parameters common to both the SDM scheme and the SFN scheme. The communication scheme component 835 may be configured as or otherwise support a means for receiving an indication of a communication scheme for the UE to use for communications with the multiple TRPs, the communication scheme including the SDM scheme, the SFN scheme, or a combination of the SDM scheme and the SFN scheme. In some examples, the communication scheme component 835 may be configured as or otherwise support a means for communicating with the multiple TRPs using the parameters of the received configuration that correspond to the indicated communication scheme.

In some examples, the parameters component 830 may be configured as or otherwise support a means for determining a second set of parameters for communicating with the multiple TRPs, the second set of parameters specific to the communication scheme based on the configuration. In some examples, the parameters component 830 may be configured as or otherwise support a means for communicating with the multiple TRPs based on the first and second sets of parameters.

In some examples, the parameters component 830 may be configured as or otherwise support a means for receiving an indication of the second set of parameters in the configuration.

In some examples, to support transmitting the message that indicates the capability, the capability component 825 may be configured as or otherwise support a means for transmitting a set of capabilities including a number of Spatial QCL assumptions or beams capable of being maintained by the UE, a number of TCI states supported by the UE, a number of TCI codepoints supported by the UE, or any combination thereof, for one or both of the SDM scheme and the SFN scheme.

In some examples, receiving signaling from the multiple TRPs, a network node, or both, in accordance with one or both of the SDM scheme and the SFN scheme based on the configuration.

In some examples, the communication scheme component 835 may be configured as or otherwise support a means for determining one or both of a configurability value or a number of DMRS ports from each TRP of the multiple TRPs based on the communication scheme, where the signaling is received based on the configurability value or the number of DMRS ports.

In some examples, the channel estimation component 840 may be configured as or otherwise support a means for performing channel estimation on the signaling using multiple sets of DMRS ports based on the configuration indicating the SDM scheme, each of the multiple sets of DMRS ports corresponding to a respective TRP of the multiple TRPs.

In some examples, the channel estimation component 840 may be configured as or otherwise support a means for performing channel estimation using a common set of DMRS ports based on the configuration indicating a first type of the SFN scheme, the common set of DMRS ports being common across the multiple TRPs.

In some examples, the channel estimation component 840 may be configured as or otherwise support a means for performing channel estimation using multiple sets of DMRS ports based on the configuration indicating a second type of the SFN scheme, each of the multiple sets of DMRS ports corresponding to a respective TRP of the multiple TRPs.

In some examples, the communication scheme component 835 may be configured as or otherwise support a means for identifying the multiple TRPs for communications based on two or more TCI states being mapped to a TCI codepoint for the UE.

In some examples, the communication scheme component 835 may be configured as or otherwise support a means for determining the communication scheme based on an association between a set of parameters indicated in the configuration and the communication scheme.

In some examples, to support receiving the configuration, the communication scheme component 835 may be configured as or otherwise support a means for receiving an indication of the communication scheme in a mode indicator field of an RRC message. In some other cases, the communication scheme component 835 may support means for receiving the indication of the communication scheme as an explicit indication in a DCI message. The communication scheme indication may include a value for a TDRA table field of the DCI message that indicates an entry of the TDRA table that may be associated with the communication scheme. The communication scheme indication may include a value of a TCI field of the DCI message that indicates multiple TCI states. In some cases, the communication scheme component 835 may determine the communication scheme indication indicates an SDM scheme based on an antenna port field of the DCI message indicating multiple CDM groups. In some other cases, the communication scheme component 835 may determine the communication scheme indication is for an SFN scheme based on the antenna port field of the DCI message indicating a single CDM group.

Figure 9:
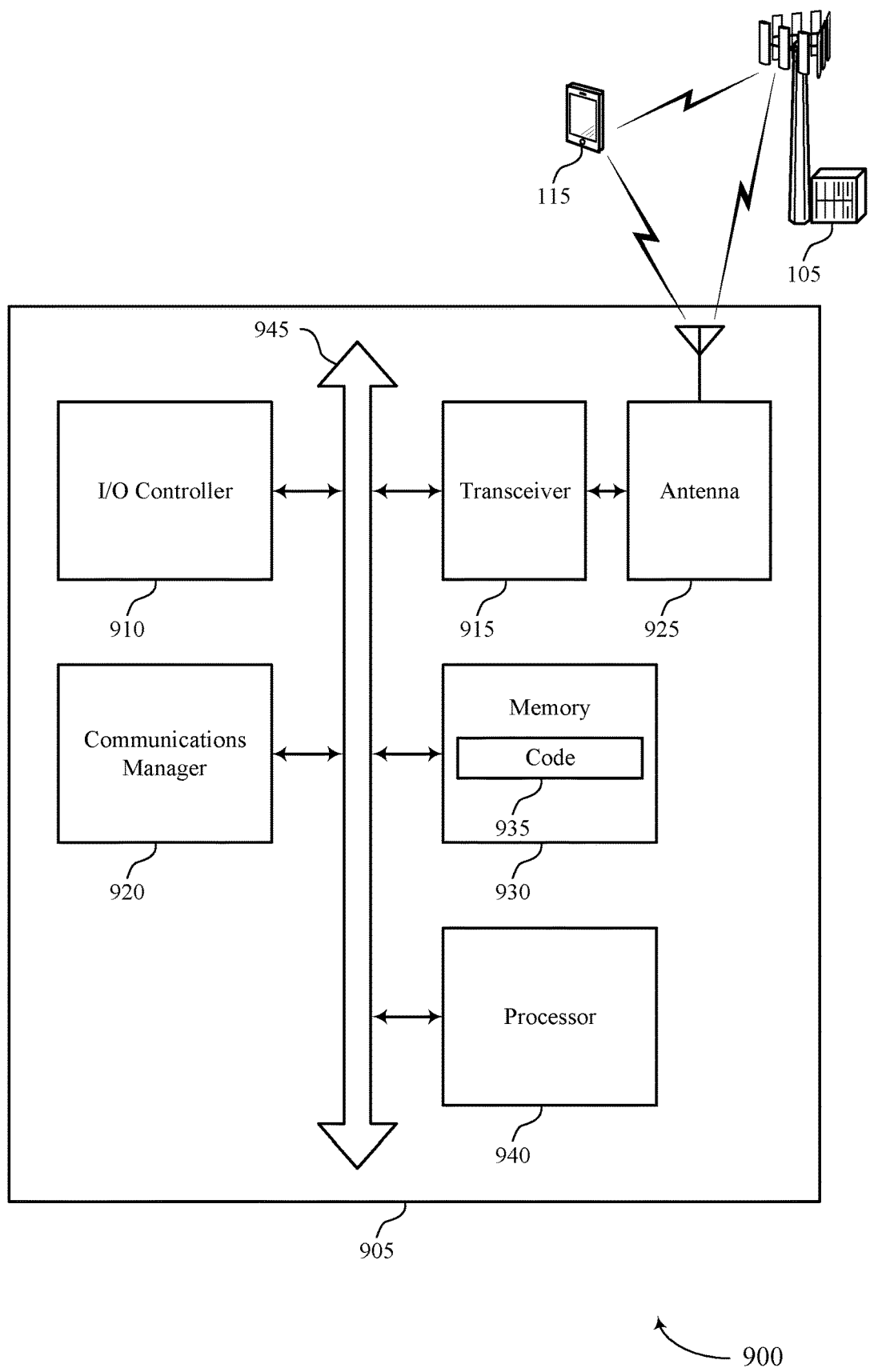
FIG. 9 shows a diagram of a system including a device that supports techniques for configuring multi-TRP communication schemes in accordance with aspects of the present disclosure.

FIG. 9 shows a diagram of a system 900 including a device 905 that supports techniques for configuring multi-TRP communication schemes in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for configuring multi-TRP communication schemes). For example, the device 905 or a component of the device

905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a configuration that indicates parameters for an SDM scheme and an SFN scheme supported by the UE for communicating with multi-TRPs, the parameters including a first set of parameters common to both the SDM scheme and the SFN scheme. The communications manager 920 may be configured as or otherwise support a means for receiving an indication of a communication scheme for the UE to use for communications with the multiple TRPs, the communication scheme including the SDM scheme, the SFN scheme, or a combination of the SDM scheme and the SFN scheme. The communications manager 920 may be configured as or otherwise support a means for communicating with the multiple TRPs using the parameters of the received configuration that correspond to the indicated communication scheme.

By including or configuring the communications manager 920 in accordance with examples as described herein, the device 905 may support techniques for improved communication reliability and reduced latency based on a TRP 205 indicating a communication scheme and a set of parameters for a UE 115 to use for communications with multi-TRPs 205.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for configuring multi-TRP communication schemes as described herein, or the processor 940 and the memory 930 may be otherwise configured to perform or support such operations.

Figure 10:
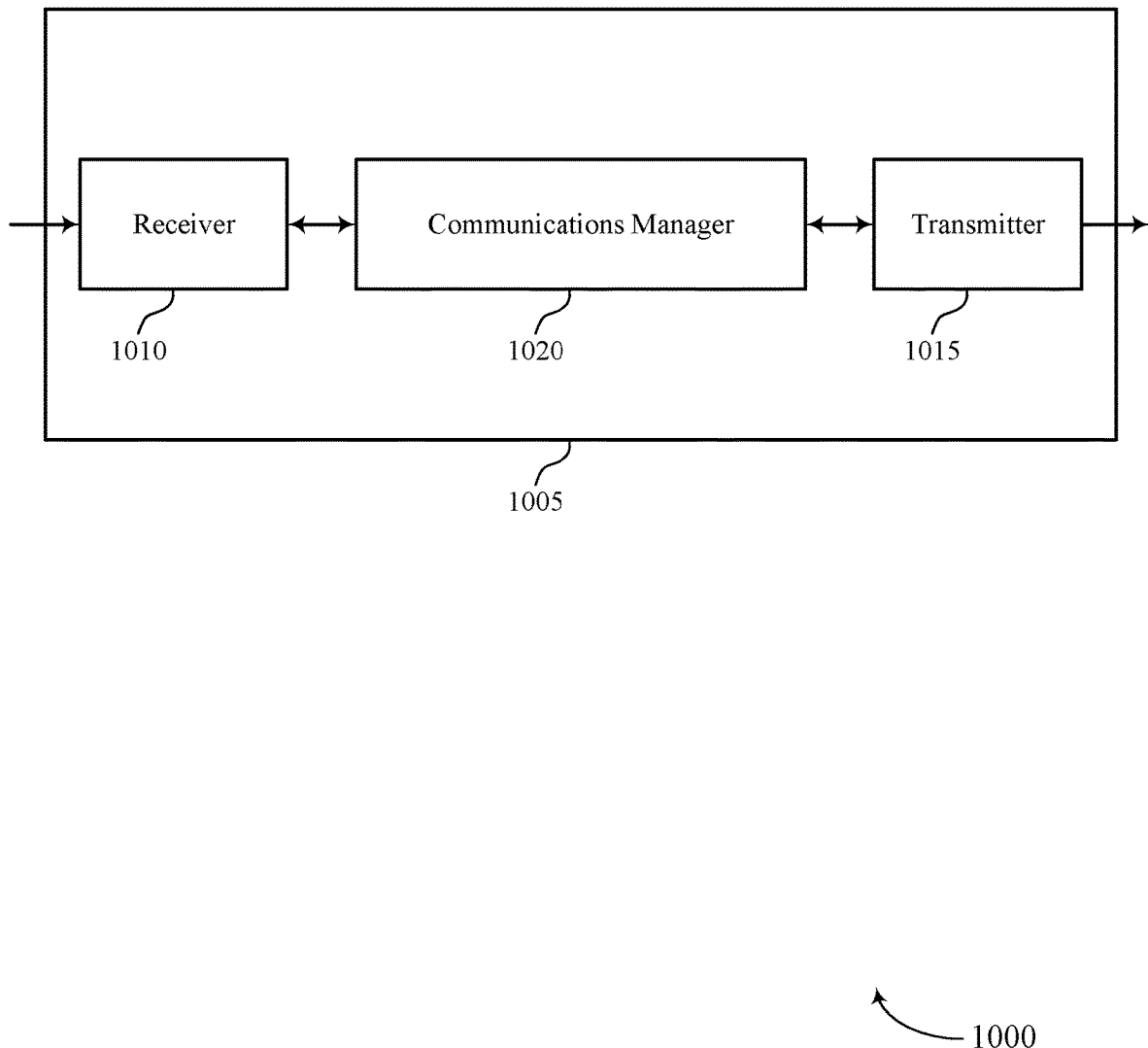
FIGS. 10 and 11 show block diagrams of devices that support techniques for configuring multi-TRP communication schemes in accordance with aspects of the present disclosure.

FIG. 10 shows a block diagram 1000 of a device 1005 that supports techniques for configuring multi-TRP communication schemes in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring multi-TRP communication schemes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring multi-TRP communication schemes). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for configuring multi-TRP communication schemes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a TRP in accordance with examples as disclosed herein. For example, the communications manager 1020 may be configured as or otherwise support a means for receiving, from a UE, a message that indicates a capability of the UE to support an SDM scheme and an SFN scheme for communicating with multiple TRPs. The communications manager 1020 may be configured as or otherwise support a means for transmitting, to the UE, a configuration that indicates parameters for the SDM scheme and the SFN scheme, the parameters including a first set of parameters common to both the SDM scheme and the SFN scheme. The communications manager 1020 may be configured as or otherwise support a means for transmitting, to the UE, an indication of a communication scheme for the UE to use for communications with the multiple TRPs, the communication scheme including the SDM scheme, the SFN scheme, or a combination of the SDM scheme and the SFN scheme.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques more efficient utilization of communication resources based on a TRP 205 indicating a communication scheme and a set of parameters for a UE 115 to use for communications with multi-TRPs 205.

Figure 11:
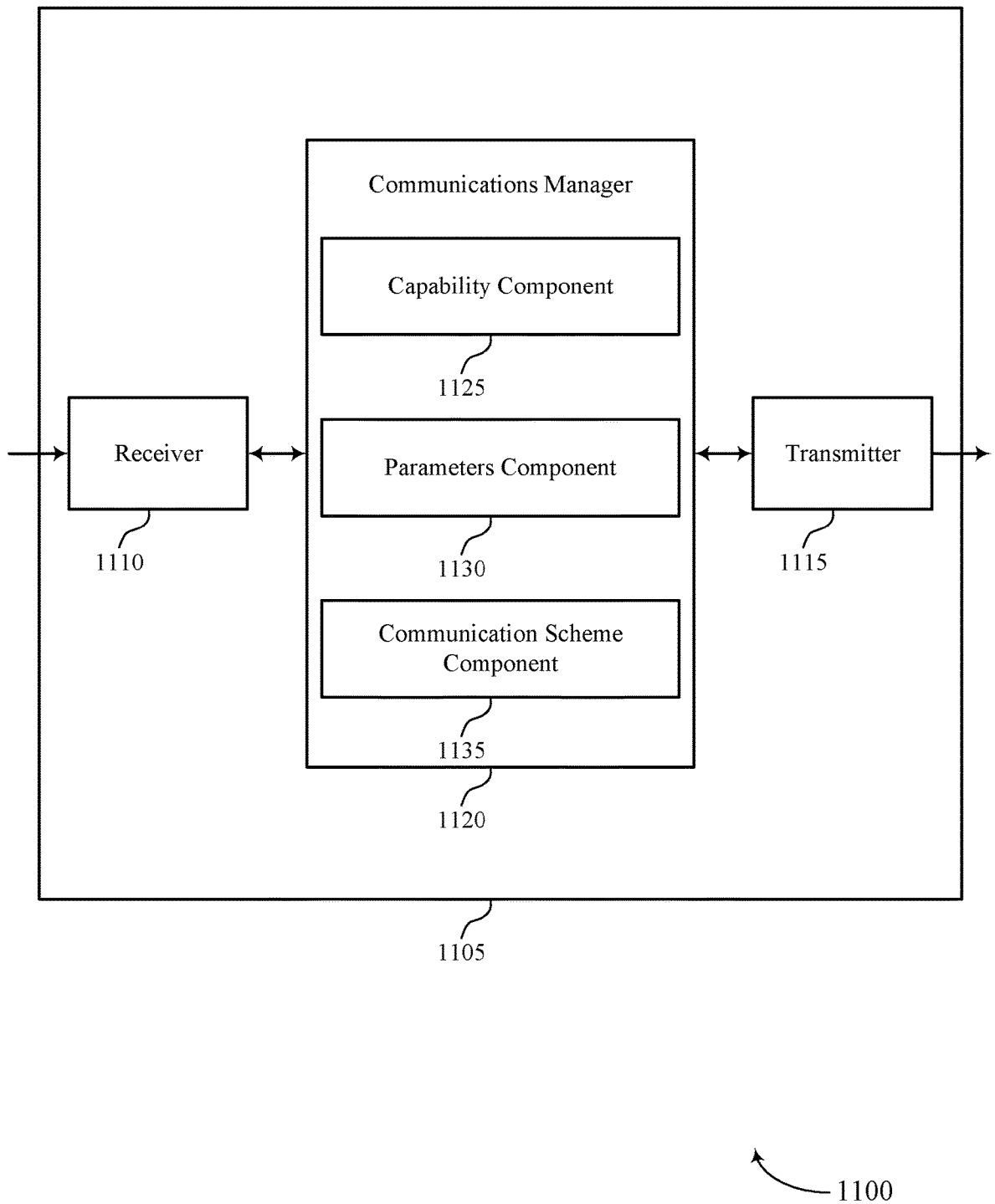

FIG. 11 shows a block diagram 1100 of a device 1105 that supports techniques for configuring multi-TRP communication schemes in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for configuring multi-TRP communication schemes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for configuring multi-TRP communication schemes). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for configuring multi-TRP communication schemes as described herein. For example, the communications manager 1120 may include a capability component 1125, a parameters component 1130, a communication scheme component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a TRP in accordance with examples as disclosed herein. The capability component 1125 may be configured as or otherwise support a means for receiving, from a UE, a message that indicates a capability of the UE to support an SDM scheme and an SFN scheme for communicating with multiple TRPs. The parameters component 1130 may be configured as or otherwise support a means for transmitting, to the UE, a configuration that indicates parameters for the SDM scheme and the SFN scheme, the parameters including a first set of parameters common to both the SDM scheme and the SFN scheme. The communication scheme component 1135 may be configured as or otherwise support a means for transmitting, to the UE, an indication of a communication scheme for the UE to use for communications with the multiple TRPs, the communication scheme including the SDM scheme, the SFN scheme, or a combination of the SDM scheme and the SFN scheme.

Figure 12:
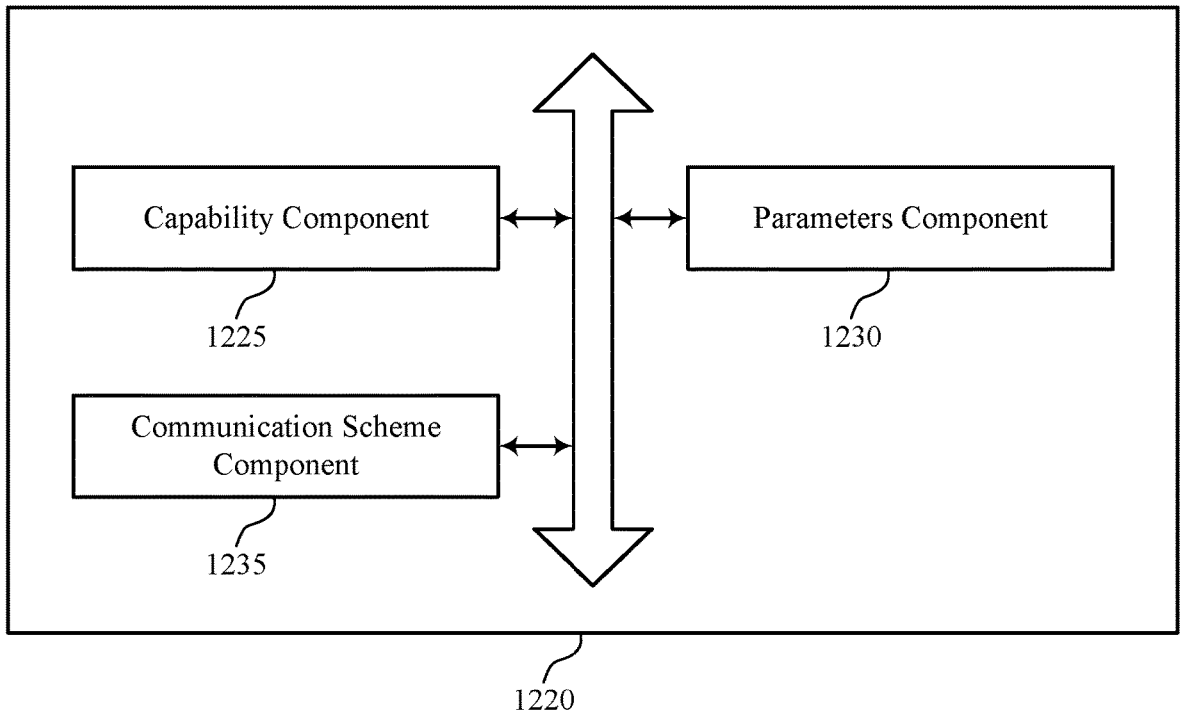
FIG. 12 shows a block diagram of a communications manager that supports techniques for configuring multi-TRP communication schemes in accordance with aspects of the present disclosure.

FIG. 12 shows a block diagram 1200 of a communications manager 1220 that supports techniques for configuring multi-TRP communication schemes in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for configuring multi-TRP communication schemes as described herein. For example, the communications manager 1220 may include a capability component 1225, a parameters component 1230, a communication scheme component 1235, or any combination thereof. Each of these components may communicate, directly or indirectly, with one another (e.g., via one or more buses).

The communications manager 1220 may support wireless communications at a TRP in accordance with examples as disclosed herein. The capability component 1225 may be configured as or otherwise support a means for receiving, from a UE, a message that indicates a capability of the UE to support an SDM scheme and an SFN scheme for communicating with multiple TRPs. The parameters component 1230 may be configured as or otherwise support a means for transmitting, to the UE, a configuration that indicates parameters for the SDM scheme and the SFN scheme, the parameters including a first set of parameters common to both the SDM scheme and the SFN scheme. The communication scheme component 1235 may be configured as or otherwise support a means for transmitting, to the UE, an indication of a communication scheme for the UE to use for communications with the multiple TRPs, the communication scheme including the SDM scheme, the SFN scheme, or a combination of the SDM scheme and the SFN scheme.

In some examples, the parameters component 1230 may be configured as or otherwise support a means for determining the first set of parameters for communications between the UE and the multiple TRPs based on the capability. In some examples, the parameters component 1230 may be configured as or otherwise support a means for determining a second set of parameters for communications between the UE and the multiple TRPs based on the capability, the second set of parameters specific to the communication scheme.

In some examples, to support receiving the message that indicates the capability, the capability component 1225 may be configured as or otherwise support a means for receiving a set of capabilities including a number of Spatial QCL assumptions or beams capable of being maintained by the UE, a number of TCI states supported by the UE, a number of TCI codepoints supported by the UE, or any combination thereof, for one or both of the SDM scheme and the SFN scheme.

In some examples, the parameters component 1230 may be configured as or otherwise support a means for determining at least one parameter of the parameters for the communication scheme based on the number of Spatial QCL assumptions or beams capable of being maintained by the UE, the number of TCI states supported by the UE, the number of TCI codepoints supported by the UE, or any combination thereof.

In some examples, the communication scheme component 1235 may be configured as or otherwise support a means for transmitting signaling to the UE in accordance with the communication scheme based on the configuration.

In some examples, the communication scheme component 1235 may be configured as or otherwise support a means for determining one or both of a configurability value or a number of DMRS ports for each TRP of the multiple TRPs based on the communication scheme, where the signaling is transmitted based on the configurability value or the number of DMRS ports.

In some examples, to support transmitting the indication of the communication scheme, the communication scheme component 1235 may be configured as or otherwise support a means for transmitting an indication of the communication scheme in a mode indicator field of an RRC message. In some other cases, the communication scheme component 1235 may support means for transmitting the indication of the communication scheme as an explicit indication in a DCI message. The communication scheme indication may include a value for a TDRA table field of the DCI message that indicates an entry of the TDRA table that may be associated with the communication scheme. The communication scheme indication may include a value of a TCI field of the DCI message that indicates multiple TCI states. In some cases, the communication scheme component 1235 may determine the communication scheme indication indicates an SDM scheme based on an antenna port field of the DCI message indicating multiple CDM groups. In some other cases, the communication scheme component 1235 may determine the communication scheme indication is for an SFN scheme based on the antenna port field of the DCI message indicating a single CDM group.

Figure 13:
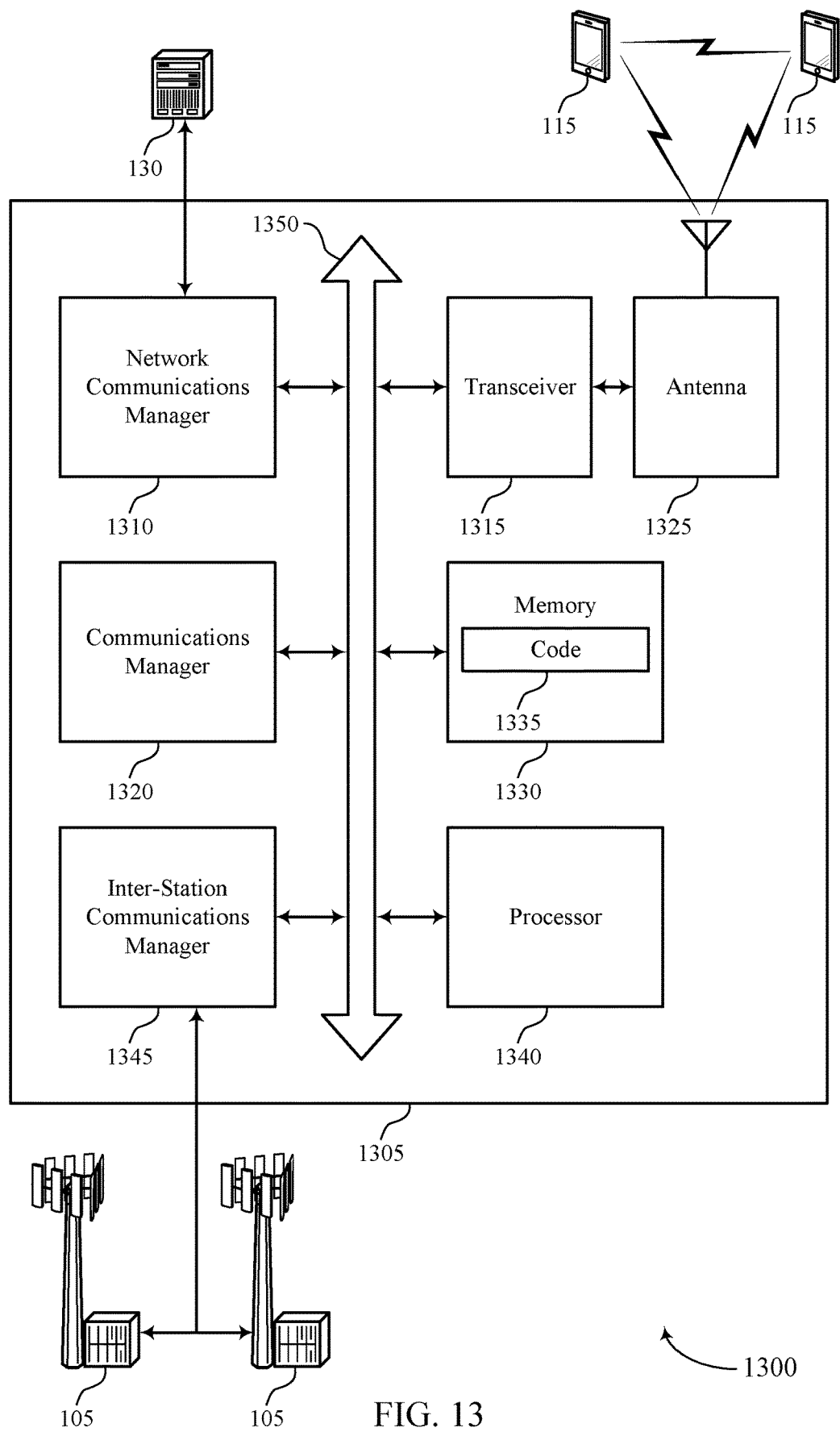
FIG. 13 shows a diagram of a system including a device that supports techniques for configuring multi-TRP communication schemes in accordance with aspects of the present disclosure.

FIG. 13 shows a diagram of a system 1300 including a device 1305 that supports techniques for configuring multi-TRP communication schemes in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for configuring multi-TRP communication schemes). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a TRP in accordance with examples as disclosed herein. For example, the communications manager 1320 may be configured as or otherwise support a means for receiving, from a UE, a message that indicates a capability of the UE to support an SDM scheme and an SFN scheme for communicating with multiple TRPs. The communications manager 1320 may be configured as or otherwise support a means for transmitting, to the UE, a configuration that indicates parameters for the SDM scheme and the SFN scheme, the parameters including a first set of parameters common to both the SDM scheme and the SFN scheme. The communications manager 1320 may be configured as or otherwise support a means for transmitting, to the UE, an indication of a communication scheme for the UE to use for communications with the multiple TRPs, the communication scheme including the SDM scheme, the SFN scheme, or a combination of the SDM scheme and the SFN scheme.

By including or configuring the communications manager 1320 in accordance with examples as described herein, the device 1305 may support techniques for improved communication reliability and reduced latency based on a TRP 205 indicating a communication scheme and a set of parameters for a UE 115 to use for communications with multi-TRPs 205.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for configuring multi-TRP communication schemes as described herein, or the processor 1340 and the memory 1330 may be otherwise configured to perform or support such operations.

Figure 14:
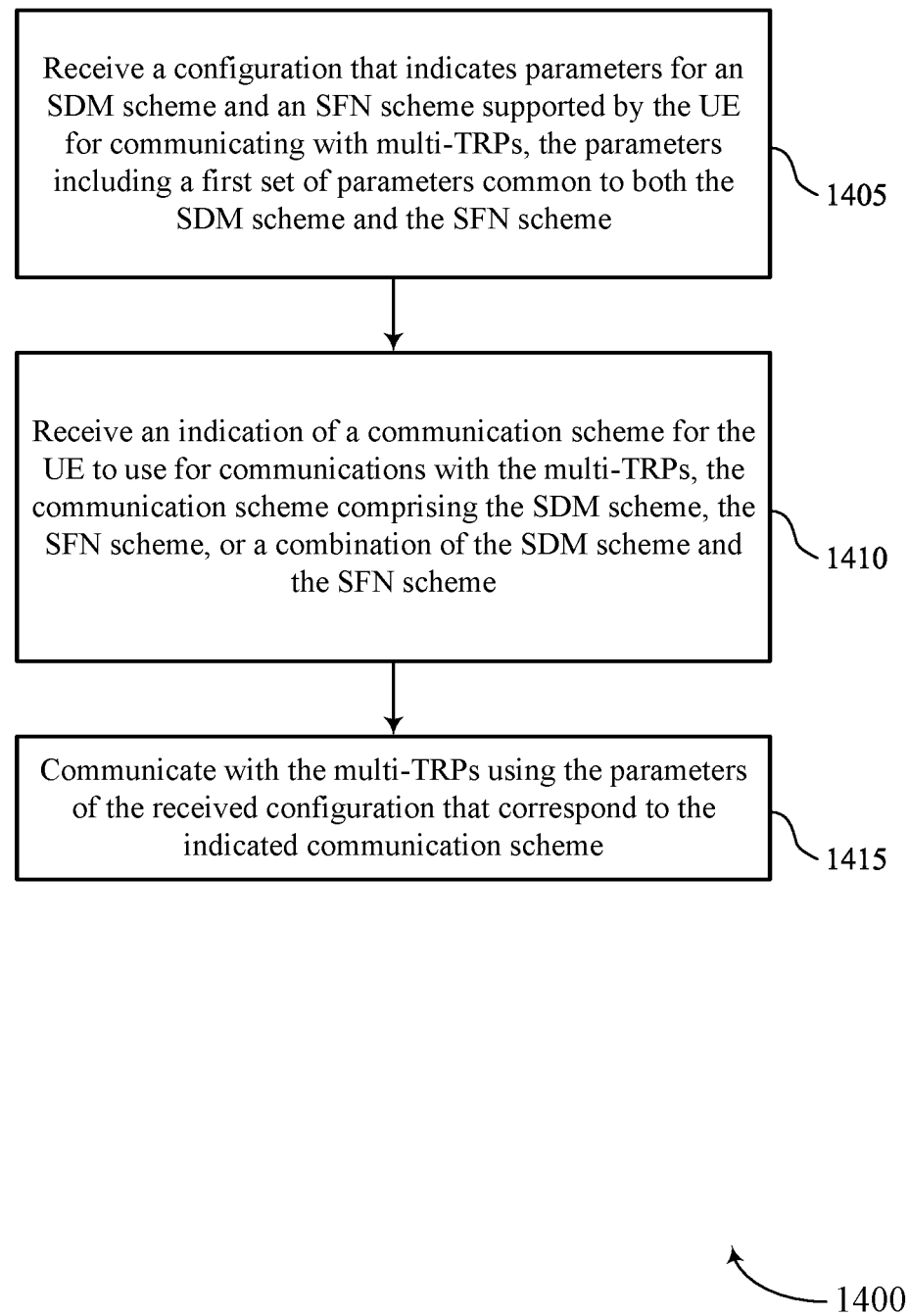
FIGS. 14 through 17 show flowcharts illustrating methods that support techniques for configuring multi-TRP communication schemes in accordance with aspects of the present disclosure.

FIG. 14 shows a flowchart illustrating a method 1400 that supports techniques for configuring multi-TRP communication schemes in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a configuration that indicates parameters for an SDM scheme and an SFN scheme supported by the UE for communicating with multi-TRPs, the parameters including a first set of parameters common to both the SDM scheme and the SFN scheme. The operations of 1405 may be performed in accordance with examples as disclosed herein. In some examples, aspects of the operations of 1405 may be performed by parameters component 830 as described with reference to FIG. 8.

At 1410, the method may include receiving an indication of a communication scheme for the UE to use for communications with the multiple TRPs, the communication scheme including the SDM scheme, the SFN scheme, or a combination of the SDM scheme and the SFN scheme. The operations of 1410 may be performed in accordance with examples as disclosed herein. In some examples, aspects of the operations of 1410 may be performed by a communication scheme component 835 as described with reference to FIG. 8.

At 1415, the method may include communicating with the multiple TRPs using the parameters of the received configuration that correspond to the indicated communication scheme. The operations of 1415 may be performed in accordance with examples as disclosed herein. In some examples, aspects of the operations of 1415 may be performed by a communication scheme component 835 as described with reference to FIG. 8.

Figure 15:
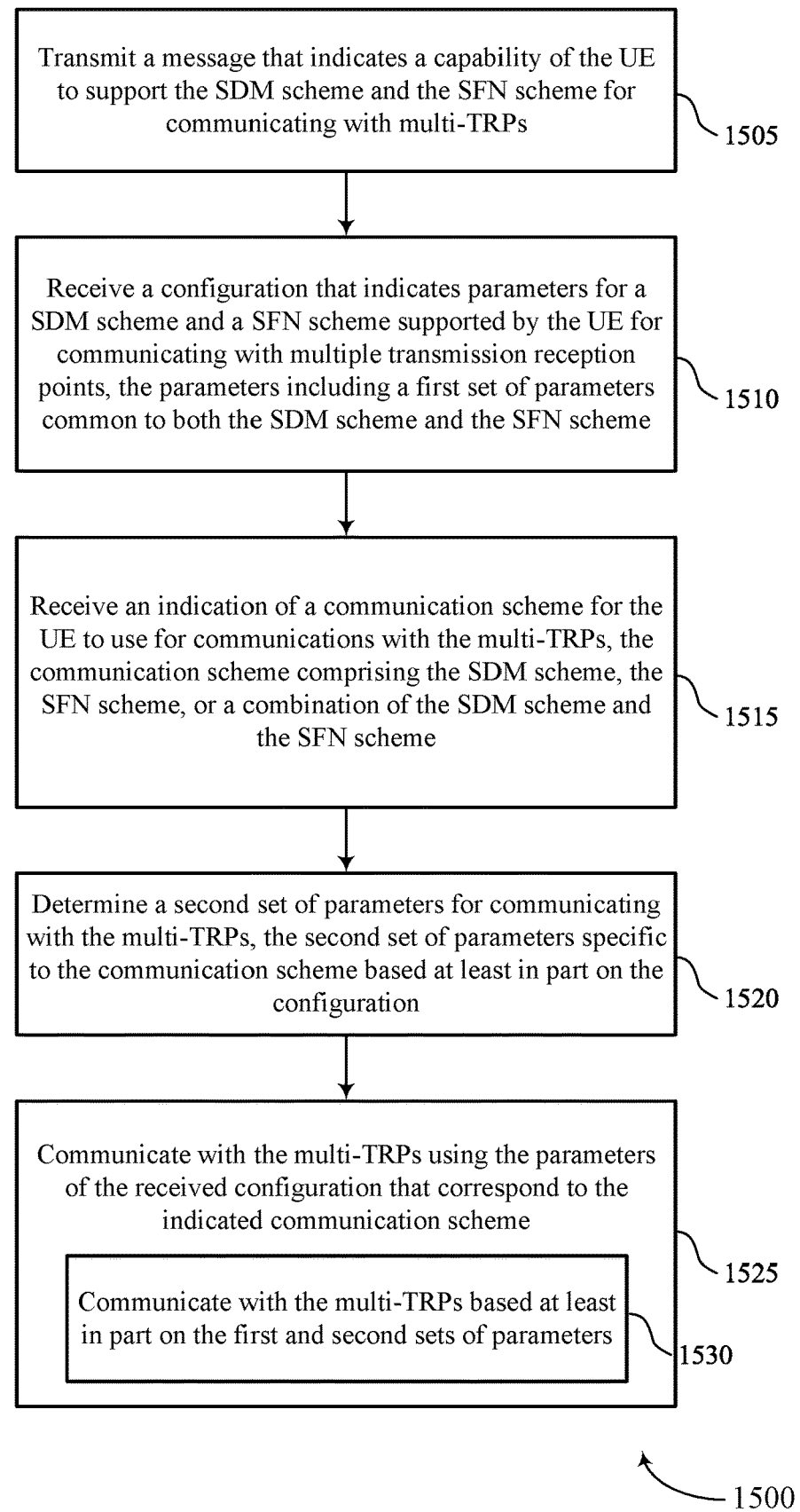

FIG. 15 shows a flowchart illustrating a method 1500 that supports techniques for configuring multi-TRP communication schemes in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting a message that indicates a capability of the UE to support an SDM scheme and an SFN scheme for communicating with multiple TRPs. The operations of 1505 may be performed in accordance with examples as disclosed herein. In some examples, aspects of the operations of 1505 may be performed by a capability component 825 as described with reference to FIG. 8.

At 1510, the method may include receiving a configuration that indicates parameters for the SDM scheme and the SFN scheme, the parameters including a first set of parameters common to both the SDM scheme and the SFN scheme. The operations of 1510 may be performed in accordance with examples as disclosed herein. In some examples, aspects of the operations of 1510 may be performed by parameters component 830 as described with reference to FIG. 8.

At 1515, the method may include receiving an indication of a communication scheme for the UE to use for communications with the multiple TRPs, the communication scheme including the SDM scheme, the SFN scheme, or a combination of the SDM scheme and the SFN scheme. The operations of 1515 may be performed in accordance with examples as disclosed herein. In some examples, aspects of the operations of 1515 may be performed by a communication scheme component 835 as described with reference to FIG. 8.

At 1520, the method may include determining a second set of parameters for communicating with the multiple TRPs, the second set of parameters specific to the communication scheme based on the configuration. The operations of 1520 may be performed in accordance with examples as disclosed herein. In some examples, aspects of the operations of 1520 may be performed by parameters component 830 as described with reference to FIG. 8.

At 1525, the method may include communicating with the multiple TRPs using the parameters of the received configuration that correspond to the indicated communication scheme. The operations of 1525 may be performed in accordance with examples as disclosed herein. In some examples, aspects of the operations of 1525 may be performed by a communication scheme component 835 as described with reference to FIG. 8.

At 1530, the method may include communicating with the multiple TRPs based on the first and second sets of parameters. The operations of 1530 may be performed in accordance with examples as disclosed herein. In some examples, aspects of the operations of 1530 may be performed by parameters component 830 as described with reference to FIG. 8.

Figure 16:
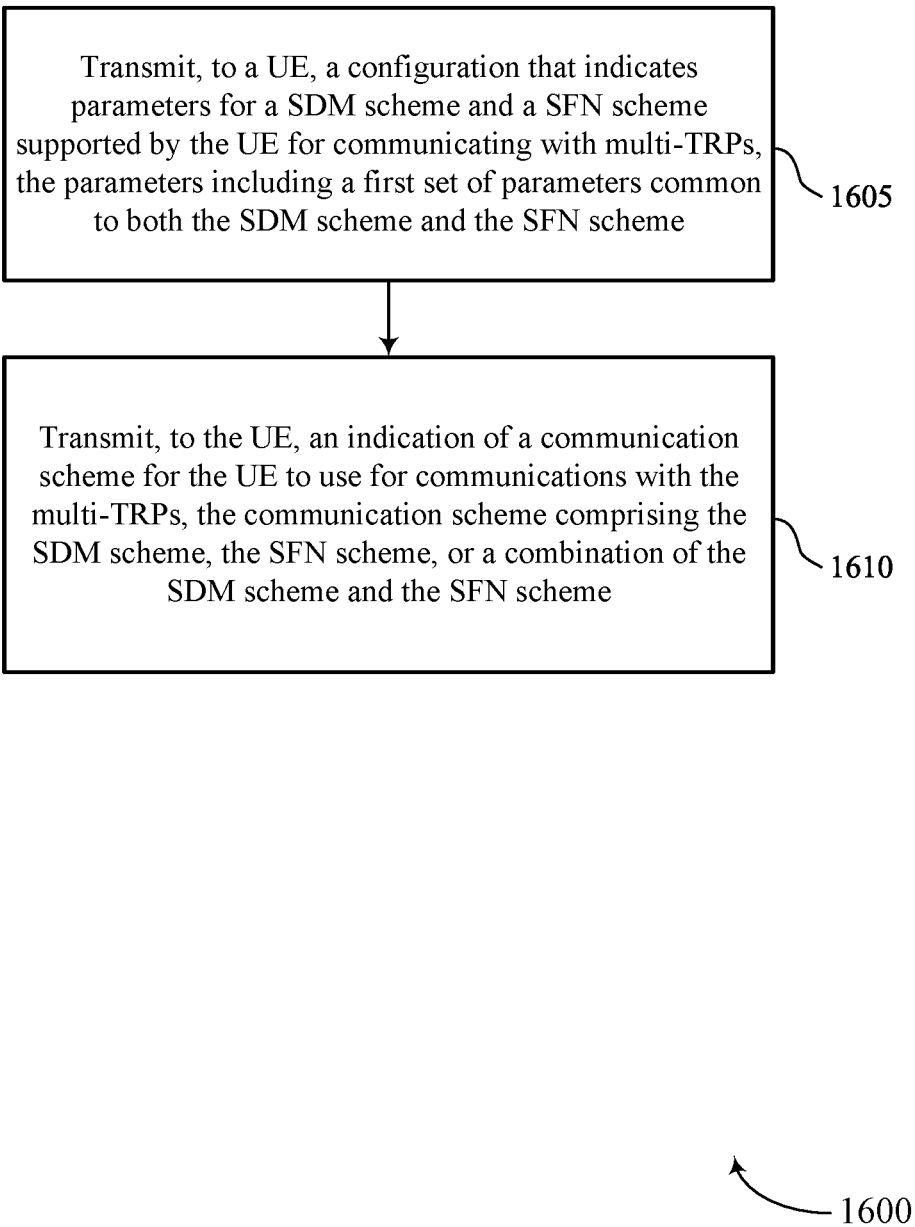

FIG. 16 shows a flowchart illustrating a method 1600 that supports techniques for configuring multi-TRP communication schemes in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to the UE, a configuration that indicates parameters for an SDM scheme and an SFN scheme supported by the UE for communicating with multi-TRPs, the parameters including a first set of parameters common to both the SDM scheme and the SFN scheme. The operations of 1605 may be performed in accordance with examples as disclosed herein. In some examples, aspects of the operations of 1605 may be performed by parameters component 1230 as described with reference to FIG. 12.

At 1610, the method may include transmitting, to the UE, an indication of a communication scheme for the UE to use for communications with the multiple TRPs, the communication scheme including the SDM scheme, the SFN scheme, or a combination of the SDM scheme and the SFN scheme. The operations of 1610 may be performed in accordance with examples as disclosed herein. In some examples, aspects of the operations of 1610 may be performed by a communication scheme component 1235 as described with reference to FIG. 12.

Figure 17:
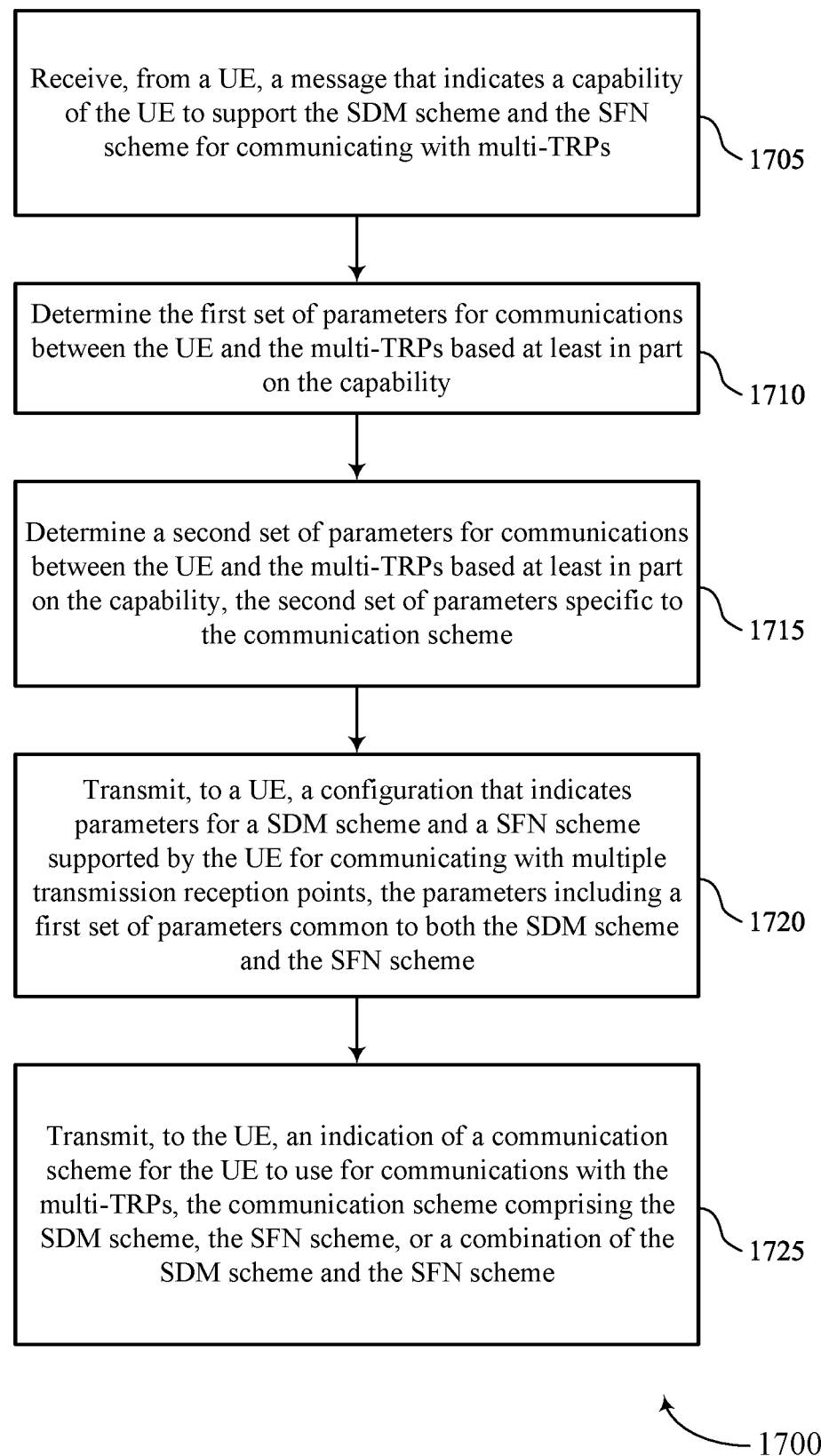

FIG. 17 shows a flowchart illustrating a method 1700 that supports techniques for configuring multi-TRP communication schemes in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a message that indicates a capability of the UE to support an SDM scheme and an SFN scheme for communicating with multiple TRPs. The operations of 1705 may be performed in accordance with examples as disclosed herein. In some examples, aspects of the operations of 1705 may be performed by a capability component 1225 as described with reference to FIG. 12.

At 1710, the method may include determining the first set of parameters for communications between the UE and the multiple TRPs based on the capability. The operations of 1710 may be performed in accordance with examples as disclosed herein. In some examples, aspects of the operations of 1710 may be performed by parameters component 1230 as described with reference to FIG. 12.

At 1715, the method may include determining a second set of parameters for communications between the UE and the multiple TRPs based on the capability, the second set of parameters specific to the communication scheme. The operations of 1715 may be performed in accordance with examples as disclosed herein. In some examples, aspects of the operations of 1715 may be performed by parameters component 1230 as described with reference to FIG. 12.

At 1720, the method may include transmitting, to the UE, a configuration that indicates parameters for the SDM scheme and the SFN scheme, the parameters including a first set of parameters common to both the SDM scheme and the SFN scheme. The operations of 1720 may be performed in accordance with examples as disclosed herein. In some examples, aspects of the operations of 1720 may be performed by parameters component 1230 as described with reference to FIG. 12.

At 1725, the method may include transmitting, to the UE, an indication of a communication scheme for the UE to use for communications with the multiple TRPs, the communication scheme including the SDM scheme, the SFN scheme, or a combination of the SDM scheme and the SFN scheme. The operations of 1725 may be performed in accordance with examples as disclosed herein. In some examples, aspects of the operations of 1725 may be performed by a communication scheme component 1235 as described with reference to FIG. 12.

The following provides an overview of aspects of the present disclosure:

Aspect 1: A method for wireless communications at a UE, comprising: receiving a configuration that indicates parameters for a spatial division multiplexing scheme and a single frequency communication scheme supported by the UE for communicating with multiple transmission reception points, the parameters including a first set of parameters common to both the spatial division multiplexing scheme and the single frequency communication scheme; receiving an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme; and communicating with the multiple transmission reception points using the parameters of the received configuration that correspond to the indicated communication scheme.

Aspect 2: The method of aspect 1, further comprising: transmitting a message that indicates a capability of the UE to support the spatial division multiplexing scheme and the single frequency communication scheme supported by the UE for communicating with multiple transmission reception points.

Aspect 3: The method of aspect 1, further comprising: determining a second set of parameters for communicating with the multiple transmission reception points, the second set of parameters specific to the communication scheme based at least in part on the configuration; and communicating with the multiple transmission reception points based at least in part on the first and second sets of parameters.

Aspect 4: The method of aspect 3, further comprising: receiving an indication of the second set of parameters in the configuration.

Aspect 5: The method of any of aspects 1 through 4, wherein transmitting the message that indicates the capability comprises: transmitting a set of capabilities comprising a number of spatial quasi-colocation assumptions or beams capable of being maintained by the UE, a number of transmission configuration indicator states supported by the UE, a number of transmission configuration indicator codepoints supported by the UE, or any combination thereof, for one or both of the spatial division multiplexing scheme and the single frequency communication scheme.

Aspect 6: The method of any of aspects 1 through 5, wherein communicating comprises receiving signaling from the multiple transmission reception points, a network node, or both, in accordance with one or both of the spatial division multiplexing scheme and the single frequency communication scheme based at least in part on the configuration.

Aspect 7: The method of aspect 6, further comprising: determining one or both of a configurability value or a number of demodulation reference signal ports from each transmission reception point of the multiple transmission reception points based at least in part on the communication scheme, wherein the signaling is received based at least in part on the configurability value or the number of demodulation reference signal ports.

Aspect 8: The method of any of aspects 6 through 7, further comprising: performing channel estimation on the signaling using multiple sets of demodulation reference signal ports based at least in part on the configuration indicating the spatial division multiplexing scheme, each of the multiple sets of demodulation reference signal ports corresponding to a respective transmission reception point of the multiple transmission reception points.

Aspect 9: The method of any of aspects 6 through 7, further comprising: performing channel estimation using a common set of demodulation reference signal ports based at least in part on the configuration indicating a first type of the single frequency communication scheme, the common set of demodulation reference signal ports being common across the multiple transmission reception points.

Aspect 10: The method of any of aspects 6 through 7, further comprising: performing channel estimation using multiple sets of demodulation reference signal ports based at least in part on the configuration indicating a second type of the single frequency communication scheme, each of the multiple sets of demodulation reference signal ports corresponding to a respective transmission reception point of the multiple transmission reception points.

Aspect 11: The method of any of aspects 6 through 10, further comprising: identifying the multiple transmission reception points for communications based at least in part on two or more transmission configuration indicator states being mapped to a transmission configuration indicator codepoint for the UE.

Aspect 12: The method of any of aspects 1 through 11, further comprising: determining the communication scheme based at least in part on an association between a set of parameters indicated in the configuration and the communication scheme.

Aspect 13: The method of any of aspects 1 through 12, wherein receiving the indication of the communication scheme comprises: receiving an indication of the communication scheme in a mode indicator field of a radio resource control message.

Aspect 14: The method of any of aspects 1 through 13, wherein receiving the indication of the communication scheme comprises: receiving a downlink control information message that comprises an indication of the communication scheme.

Aspect 15: The method of aspect 14, wherein the indication of the communication scheme comprises an explicit indication in the downlink control information message.

Aspect 16: The method of any of aspects 14 through 15, wherein the indication of the communication scheme comprises a value for a time domain resource allocation table field of the downlink control information message that indicates an entry of a time domain resource allocation table that is associated with the communication scheme.

Aspect 17: The method of any of aspects 14 through 15, wherein the indication of the communication scheme comprises a value of a transmission configuration indicator field of the downlink control information message that indicates a plurality of transmission configuration indicator states.

Aspect 18: The method of aspect 17, further comprising: determining that the communication scheme comprises the spatial division multiplexing scheme based at least in part on an antenna port field of the downlink control information message indicating a plurality of code division multiplexing groups.

Aspect 19: The method of aspect 17, further comprising: determining that the communication scheme comprises the single frequency communication scheme based at least in part on an antenna port field of the downlink control information message indicating a single code division multiplexing group.

Aspect 20: A method for wireless communications at a transmission reception point, comprising: transmitting, to the UE, a configuration that indicates parameters for a spatial division multiplexing scheme and a single frequency communication scheme supported by the UE for communicating with multiple transmission reception points, the parameters including a first set of parameters common to both the spatial division multiplexing scheme and the single frequency communication scheme; and transmitting, to the UE, an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme.

Aspect 21: The method of aspect 20, further comprising: receiving, from a UE, a message that indicates a capability of the UE to support the spatial division multiplexing scheme and the single frequency communication scheme for communicating with multiple transmission reception points.

Aspect 22: The method of aspect 20, further comprising: determining the first set of parameters for communications between the UE and the multiple transmission reception points based at least in part on the capability; and determining a second set of parameters for communications between the UE and the multiple transmission reception points based at least in part on the capability, the second set of parameters specific to the communication scheme.

Aspect 23: The method of any of aspects 20 through 22, wherein receiving the message that indicates the capability comprises: receiving a set of capabilities comprising a number of spatial quasi-colocation assumptions or beams capable of being maintained by the UE, a number of transmission configuration indicator states supported by the UE, a number of transmission configuration indicator codepoints supported by the UE, or any combination thereof, for one or both of the spatial division multiplexing scheme and the single frequency communication scheme.

Aspect 24: The method of aspect 23, further comprising: determining at least one parameter of the parameters for the communication scheme based at least in part on the number of spatial quasi-colocation assumptions or beams capable of being maintained by the UE, the number of transmission configuration indicator states supported by the UE, the number of transmission configuration indicator codepoints supported by the UE, or any combination thereof.

Aspect 25: The method of any of aspects 20 through 24, further comprising: transmitting signaling to the UE in accordance with the communication scheme based at least in part on the configuration.

Aspect 26: The method of aspect 25, further comprising: determining one or both of a configurability value or a number of demodulation reference signal ports for each transmission reception point of the multiple transmission reception points based at least in part on the communication scheme, wherein the signaling is transmitted based at least in part on the configurability value or the number of demodulation reference signal ports.

Aspect 27: The method of any of aspects 20 through 26, wherein transmitting the indication of the communication scheme comprises: transmitting an indication of the communication scheme in a mode indicator field of a radio resource control message.

Aspect 28: The method of any of aspects 20 through 27, wherein transmitting the indication of the communication scheme comprises: receiving a downlink control information message that comprises an indication of the communication scheme.

Aspect 29: The method of aspect 28, wherein the indication of the communication scheme comprises an explicit indication in the downlink control information message.

Aspect 30: The method of any of aspects 28 through 29, wherein the indication of the communication scheme comprises a value for a time domain resource allocation table field of the downlink control information message that indicates an entry of a time domain resource allocation table that is associated with the communication scheme.

Aspect 31: The method of any of aspects 28 through 29, wherein the indication of the communication scheme comprises a value of a transmission configuration indicator field of the downlink control information message that indicates a plurality of transmission configuration indicator states.

Aspect 32: The method of aspect 31, wherein the downlink control information message further comprises an antenna port field indicating a plurality of code division multiplexing groups to indicate that the communication scheme comprises the spatial division multiplexing scheme.

Aspect 33: The method of aspect 31, wherein the downlink control information message further comprises an antenna port field indicating a single code division multiplexing group to indicate that the communication scheme comprises the spatial division multiplexing scheme.

Aspect 34: An apparatus for wireless communications at a UE, comprising a processor; memory coupled with the processor; and instructions stored in the memory and executable by the processor to cause the apparatus to perform a method of any of aspects 1 through 19.

Aspect 35: An apparatus for wireless communications at a UE, comprising at least one means for performing a method of any of aspects 1 through 19.

Aspect 36: A non-transitory computer-readable medium storing code for wireless communications at a UE, the code comprising instructions executable by a processor to perform a method of any of aspects 1 through 19.

Aspect 37: An apparatus for wireless communications at a transmission reception point, comprising a processor; memory coupled with the processor; and instructions stored in the memory and executable by the processor to cause the apparatus to perform a method of any of aspects 20 through 33.

Aspect 38: An apparatus for wireless communications at a transmission reception point, comprising at least one means for performing a method of any of aspects 20 through 33.

Aspect 39: A non-transitory computer-readable medium storing code for wireless communications at a transmission reception point, the code comprising instructions executable by a processor to perform a method of any of aspects 20 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a configuration that indicates parameters for a spatial division multiplexing scheme and for a single frequency communication scheme supported by the UE for communicating with multiple transmission reception points, the parameters including a first set of parameters common to both the spatial division multiplexing scheme and the single frequency communication scheme;
    receiving an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme; and
    communicating with the multiple transmission reception points according to the indicated communication scheme using at least the first set of parameters common to both the spatial division multiplexing scheme and the single frequency communication scheme.

2. The method of claim 1, further comprising:
    transmitting a message that indicates a capability of the UE to support the spatial division multiplexing scheme and the single frequency communication scheme for communicating with the multiple transmission reception points.

3. The method of claim 2, wherein transmitting the message that indicates the capability comprises:
    transmitting a set of capabilities comprising a number of spatial quasi-colocation assumptions or beams capable of being maintained by the UE, a number of transmission configuration indicator states supported by the UE, a number of transmission configuration indicator codepoints supported by the UE, or any combination thereof, for one or both of the spatial division multiplexing scheme and the single frequency communication scheme.

4. The method of claim 1, further comprising:
    determining a second set of parameters for communicating with the multiple transmission reception points, the second set of parameters specific to the indicated communication scheme based at least in part on the configuration; and
    communicating with the multiple transmission reception points based at least in part on the first set of parameters and the second set of parameters.

5. The method of claim 4, further comprising:
    receiving an indication of the second set of parameters in the configuration.

6. The method of claim 1, wherein communicating comprises:
    receiving signaling from the multiple transmission reception points, a network node, or both, in accordance with one or both of the spatial division multiplexing scheme and the single frequency communication scheme based at least in part on the indicated communication scheme.

7. The method of claim 6, further comprising:
determining one or both of a configurability value or a number of demodulation reference signal ports from each transmission reception point of the multiple transmission reception points based at least in part on the indicated communication scheme, wherein the signaling is received based at least in part on the configurability value or the number of demodulation reference signal ports.

8. The method of claim 6, further comprising:
performing channel estimation on the signaling using multiple sets of demodulation reference signal ports based at least in part on the indicated communication scheme being the spatial division multiplexing scheme, each of the multiple sets of demodulation reference signal ports corresponding to a respective transmission reception point of the multiple transmission reception points.

9. The method of claim 6, further comprising:
performing channel estimation using a common set of demodulation reference signal ports based at least in part on the indicated communication scheme being a first type of the single frequency communication scheme, the common set of demodulation reference signal ports being common across the multiple transmission reception points.

10. The method of claim 6, further comprising:
performing channel estimation using multiple sets of demodulation reference signal ports based at least in part on the indicated communication scheme being a second type of the single frequency communication scheme, each of the multiple sets of demodulation reference signal ports corresponding to a respective transmission reception point of the multiple transmission reception points.

11. The method of claim 6, further comprising:
identifying the multiple transmission reception points for communications based at least in part on two or more transmission configuration indicator states being mapped to a transmission configuration indicator codepoint for the UE.

12. The method of claim 1, further comprising:
determining the indicated communication scheme based at least in part on an association between a set of parameters indicated in the configuration and the indicated communication scheme.

13. The method of claim 1, wherein receiving the indication of the communication scheme comprises:
receiving the indication of the communication scheme in a mode indicator field of a radio resource control message.

14. The method of claim 1, wherein receiving the indication of the communication scheme comprises:
receiving a downlink control information message that comprises the indication of the communication scheme.

15. The method of claim 14, wherein the indication of the communication scheme comprises one or more of an explicit indication in the downlink control information message, a value for a time domain resource allocation table field of the downlink control information message that indicates an entry of a time domain resource allocation table that is associated with the indicated communication scheme, and a value of a transmission configuration indicator field of the downlink control information message that indicates a plurality of transmission configuration indicator states.

16. The method of claim 14, further comprising:
determining that the indicated communication scheme comprises the spatial division multiplexing scheme based at least in part on an antenna port field of the downlink control information message indicating a plurality of code division multiplexing groups.

17. The method of claim 14, further comprising:
determining that the indicated communication scheme comprises the single frequency communication scheme based at least in part on an antenna port field of the downlink control information message indicating a single code division multiplexing group.

18. A method for wireless communications at a transmission reception point, comprising:
transmitting, to a user equipment (UE), a configuration that indicates parameters for a spatial division multiplexing scheme and for a single frequency communication scheme supported by the UE for communicating with multiple transmission reception points, the parameters including a first set of parameters common to both the spatial division multiplexing scheme and the single frequency communication scheme;
transmitting, to the UE, an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme; and
transmitting signaling to the UE in accordance with the indicated communication scheme based at least in part on the first set of parameters common to both the spatial division multiplexing scheme and the single frequency communication scheme.

19. The method of claim 18, further comprising:
receiving, from the UE, a message that indicates a capability of the UE to support the spatial division multiplexing scheme and the single frequency communication scheme for communicating with the multiple transmission reception points.

20. The method of claim 19, further comprising:
determining the first set of parameters for communications between the UE and the multiple transmission reception points based at least in part on the capability; and
determining a second set of parameters for communications between the UE and the multiple transmission reception points based at least in part on the capability, the second set of parameters specific to the indicated communication scheme.

21. The method of claim 20, wherein receiving the message that indicates the capability comprises:
receiving a set of capabilities comprising a number of spatial quasi-colocation assumptions or beams capable of being maintained by the UE, a number of transmission configuration indicator states supported by the UE, a number of transmission configuration indicator codepoints supported by the UE, or any combination thereof, for one or both of the spatial division multiplexing scheme and the single frequency communication scheme.

22. The method of claim 21, further comprising:
determining at least one parameter of the parameters for the indicated communication scheme based at least in part on the number of spatial quasi-colocation assumptions or beams capable of being maintained by the UE, the number of transmission configuration indicator states supported by the UE, the number of transmission configuration indicator codepoints supported by the UE, or any combination thereof.

23. The method of claim 18, wherein transmitting the indication of the communication scheme comprises:
transmitting the indication of the communication scheme in a mode indicator field of a radio resource control message.

24. The method of claim 18, wherein transmitting the indication of the communication scheme comprises:
transmitting a downlink control information message that comprises the indication of the communication scheme.

25. The method of claim 24, wherein the indication of the communication scheme comprises one or more of an explicit indication in the downlink control information message, a value for a time domain resource allocation table field of the downlink control information message that indicates an entry of a time domain resource allocation table that is associated with the indicated communication scheme, and a value of a transmission configuration indicator field of the downlink control information message that indicates a plurality of transmission configuration indicator states.

26. The method of claim 24, wherein the downlink control information message further comprises an antenna port field indicating a plurality of code division multiplexing groups to indicate that the indicated communication scheme comprises the spatial division multiplexing scheme.

27. The method of claim 24, wherein the downlink control information message further comprises an antenna port field indicating a single code division multiplexing group to indicate that the indicated communication scheme comprises the spatial division multiplexing scheme.

28. An apparatus for wireless communications at a user equipment (UE), comprising:
a processor;
memory coupled with the processor; and
instructions stored in the memory and executable by the processor to cause the apparatus to:
receive a configuration that indicates parameters for a spatial division multiplexing scheme and for a single frequency communication scheme supported by the UE for communicating with multiple transmission reception points, the parameters including a first set of parameters common to both the spatial division multiplexing scheme and the single frequency communication scheme;
receive an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme; and
communicate with the multiple transmission reception points according to the indicate communication scheme using at least the first set of parameters common to both the spatial division multiplexing scheme and the single frequency communication scheme.

29. An apparatus for wireless communications at a transmission reception point, comprising:
a processor;
memory coupled with the processor; and
instructions stored in the memory and executable by the processor to cause the apparatus to:
transmit, to a user equipment (UE), a configuration that indicates parameters for a spatial division multiplexing scheme and for a single frequency communication scheme supported by the UE for communicating with multiple transmission reception points, the parameters including a first set of parameters common to both the spatial division multiplexing scheme and the single frequency communication scheme;
transmit, to the UE, an indication of a communication scheme for the UE to use for communications with the multiple transmission reception points, the communication scheme comprising the spatial division multiplexing scheme, the single frequency communication scheme, or a combination of the spatial division multiplexing scheme and the single frequency communication scheme; and
transmit signaling to the UE in accordance with the indicated communication scheme based at least in part on the first set of parameters common to both the spatial division multiplexing scheme and the single frequency communication scheme.

\* \* \* \* \*